(12) United States Patent
Malton et al.

(10) Patent No.: US 12,218,949 B2
(45) Date of Patent: *Feb. 4, 2025

(54) RISK-AWARE ACCESS CONTROL SYSTEM AND RELATED METHODS

(71) Applicant: BlackBerry Limited, Waterloo (CA)

(72) Inventors: Andrew James Malton, Waterloo (CA); Andrew Eric Walenstein, Issaquah, WA (US); Jinxin Liu, Ottawa (CA); Burak Kantarci, Ottawa (CA); Melike Erol Kantarci, Ottawa (CA); Murat Simsek, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,793

(22) Filed: Dec. 6, 2023

(65) Prior Publication Data

US 2024/0121244 A1  Apr. 11, 2024

Related U.S. Application Data

(63) Continuation of application No. 17/129,334, filed on Dec. 21, 2020, now Pat. No. 11,888,857.

(51) Int. Cl.
*H04L 9/40* (2022.01)
*G06F 21/31* (2013.01)

(52) U.S. Cl.
CPC ............ *H04L 63/105* (2013.01); *G06F 21/31* (2013.01); *H04L 63/205* (2013.01); *G06F 2221/2103* (2013.01)

(58) Field of Classification Search
CPC ..... H04L 63/105; H04L 63/205; H04L 63/20; H04L 63/10; G06F 21/31; G06F 2221/2103; H04W 12/08
See application file for complete search history.

(56) References Cited

U.S. PATENT DOCUMENTS 9,807,094 B1  10/2017  Liu et al.
10,404,735 B2  9/2019  Jain
(Continued)

FOREIGN PATENT DOCUMENTS

CN  111935165  9/2022
WO  0111845 A2  2/2001

OTHER PUBLICATIONS

P. Andriotis, T. Tryfonas, G. Oikonomou, and C. Yildiz, "A pilot study on the security of pattern screen-lock methods and soft side channel attacks," in Proceedings of the Sixth ACM Conference on Security and Privacy in Wireless and Mobile Networks, sen WiSec 13; Association for Computing Machinery, 2013, 6 pages. [Online], Available: https://doi.org/10.1145/2462096.2462098. 2013.

(Continued)

*Primary Examiner* — Abiy Getachew
(74) *Attorney, Agent, or Firm* — Trop Pruner & Hu, P.C.

(57) ABSTRACT

A risk-aware access control system and related methods are provided. In accordance with one aspect of the present disclosure, there is a provided a method of risk-aware access control, comprising: detecting a request to perform an action with respect to two factors, the factors being of a factor type selecting people, devices, documents, and location, wherein the factors are of a different factor type; determining a coupling associated with the requested action based on the factors of the requested action; determining a risk level associated with the coupling; denying the requested action in response to a determination that the risk level does not match a security policy; and allowing the requested action in response to a determination that the risk level matches the security policy.

20 Claims, 13 Drawing Sheets

(56) References Cited

U.S. PATENT DOCUMENTS

| | | | |
|---|---|---|---|
| 11,449,623 | B2 | 9/2022 | Little et al. |
| 2011/0173084 | A1 | 7/2011 | Cheng |
| 2011/0225625 | A1* | 9/2011 | Wolfson .............. H04L 63/205 726/1 |
| 2014/0189808 | A1* | 7/2014 | Mahaffey ............ G06F 21/6245 726/4 |
| 2017/0332238 | A1 | 11/2017 | Bansal |
| 2017/0372055 | A1 | 12/2017 | Robinson |
| 2019/0286806 | A1 | 9/2019 | Robinson |
| 2021/0400075 | A1* | 12/2021 | Stergioudis ......... H04L 63/1433 |
| 2021/0400087 | A1* | 12/2021 | Cui ...................... H04L 63/083 |
| 2022/0116392 | A1* | 4/2022 | Shah .................. H04L 63/0876 |
| 2022/0141220 | A1 | 5/2022 | Lind |

OTHER PUBLICATIONS

F. Anjomshoa, M. Aloqaily, B. Kantarci, M. Erol-Kantarci, and S. Schuckers, "Social Behaviometrics for Personalized Devices in the Internet of Things Era," IEEE Access, vol. 5, pp. 12199-12213 2017.

A. J. Aviv, K. Gibson, E. Mossop, M. Blaze, and J. M. Smith, "Smudge attacks on smartphone touch screens," in Proceedings of the 4th USENIX Conference on Offensive Technologies, ser. Wootio. USA: Usenix Association, p. 1-10 2010.

A. J. Aviv, B. Sapp, M. Blaze, and J. M. Smith, "Practicality of accelerometer side channels on smartphones," in Proceedings of the 28th Annual Computer Security Applications Conference, ser. ACSAC 12. New York, NY, USA: Association for Computing Machinery, [Online], Available: https://doi.org/10.1145/2420950.2420957, 10 pages, 2012.

S. Cha and K. Yeh, "A data-driven security risk assessment scheme for personal data protection," IEEE Access, vol. 6, pp. 50510-50517 2018.

I. Deutschmann, P. Nordstrom, and L. Nilsson, "Continuous authentication using behavioral biometrics," IT Professional, vol. 15, No. 4, pp. 12-15 Jul. 2013.

S. Egelman, S. Jain, R. S. Portnoff, K. Liao, S. Consolvo, and D. Wagner, "Are You Ready to Lock?" in Proceedings of the 2014 ACM SIGSAC Conference on Computer and Communications Security, sen CCS '14. Scottsdale, Arizona, USA: Association for Computing Machinery, 12 pages. [Online], Available: https://doi.org/1 0.1145/2660267.2660273 Nov. 2014.

M. Ester, H.-P. Kriegel, J. Sander, and X. Xu, "A Density-Based Algorithm for Discovering Clusters in Large Spatial Databases with Noise," KDD'96: Proceedings of the Second International Conference on Knowledge Discovery and Data Mining, pp. 226-231 Aug. 1996.

H. Habibzadeh, C. Kaptan, T. Soyata, B. Kantarci, and A. Boukerche, "Smart City system design: A comprehensive study of the application and data planes," ACM Comput. Surv., vol. 52, No. 2, [Online], Available: https://doi.org/10.1145/3309545, 38 pages, May 2019.

H. Habibzadeh, T. Soyata, B. Kantarci, A. Boukerche, and C. Kaptan, "Sensing, communication and security planes: A new challenge for a smart city system design," Computer Networks, vol. 144, pp. 163-200, 2018 [Online]. Available: http://sciencedirect.com/science/article/pii/S1389128618306534 2018.

M. S. Jalali, S. Razak, W. Gordon, E. Perakslis, and S. Madnick, "Health Care and Cybersecurity: Bibliometric Analysis of the Literature," Journal of Medical Internet Research, vol. 21, No. 2, 25 pages. [Online], Available: https://www.jmir.Org/2019/2/e12644/ 2019.

H. Khan, U. Hengartner, and D. Vogel, "Usability and security perceptions of implicit authentication: convenient, secure, sometimes annoying," in Proceedings of the Eleventh USENIX Conference on Usable Privacy and Security, SOUPS '15. Ottawa, Canada: USENIX Association, pp. 225-239 Jul. 2015.

C.-H. Lee, "Unsupervised and supervised learning to evaluate event relatedness based on content mining from social-media streams," Expert Systems with Applications, vol. 39, No. 18, pp. 13338-13356, [Online], Available: http://www.sciencedirect.com/science/article/pii/S0957417412007841 Dec. 2012.

W.-H. Lee and R. B. Lee, "Implicit Smartphone User Authentication with Sensors and Contextual Machine Learning," in 2017 47th Annual IEEE/IFIP International Conference on Dependable Systems and Networks (DSN), 13 pages, iSSN: 2158-3927 2017.

J. C. D. Lima, C. C. Rocha, I. Augustin, and M. A. Dantas, "A Context- Aware Recommendation System to Behavioral Based Authentication in Mobile and Pervasive Environments," in 2011 IFIP 9th International Conference on Embedded and Ubiquitous Computing, pp. 312-319 Oct. 2011.

L. van der Maaten and G. Hinton, "Visualizing data using t-SNE," Journal of machine learning research, vol. 9, No. Nov, pp. 2579-2605 2008.

G. Martin, P. Martin, C. Hankin, A. Darzi, and J. Kinross, "Cybersecurity and healthcare: how safe are we?" BMJ, vol. 358, [Online], Available: https://www.bmj.com/content/358/bmj.j3179, 4 pages, Jul. 2017.

V. M. Patel, R. Chellappa, D. Chandra, and B. Barbello, "Continuous User Authentication on Mobile Devices: Recent progress and remaining challenges," IEEE Signal Processing Magazine, vol. 33, No. 4, pp. 49-61 Jul. 2016.

G. Petracca, E Capobianco, C. Skalka, and T. Jaeger, "On risk in access control enforcement," in Proceedings of the 22nd ACM on Symposium on Access Control Models and Technologies, SACMAT 17 Abstracts. New York, NY, USA: Association for Computing Machinery, p. 3142 2017.

K. Quintal, et al.; "Contextual, Behavioral, and Biometric Signatures for Continuous Authentication," IEEE Internet Computing, pp. 1-11 2019.

K. I. Ramatsakane and W. S. Leung, "Pick location security: Seamless integrated multi-factor authentication," in 2IST-Africa Week Conference (IST-Africa), pp. 1-10 May 2017.

Z. I. Rauen, F. Anjomshoa, and B. Kantarci, "Gesture and Sociability¬based Continuous Authentication on Smart Mobile Devices," in Proceedings of the 16th ACM International Symposium on Mobility Management and Wireless Access, ser. MobiWac' 18. New York, NY, USA: ACM, 2018, pp. 51-58, event-place: Montreal, QC, Canada. [Online], Available: http://doi.acm.org/10.1145/3265863.3265873, 2018.

Z. Sitov, J. ednka, Q. Yang, G. Peng, G. Zhou, P. Gasti, and K. S. Balagani, "HMOG: New behavioral biometric features for continuous authentication of smartphone users," IEEE Transactions on Information Forensics and Security, vol. 11, No. 5, pp. 877-892 May 2016.

S. Vhaduri and C. Poellabauer, "Multi-modal biometric-based implicit authentication of wearable device users," IEEE Transactions on Information Forensics and Security, vol. 14, No. 12, pp. 3116-3125 Dec. 2019.

C. Wu, W. Ding, R. Liu, J. Wang, A. C. Wang, J. Wang, S. Li, Y. Zi, and Z. L. Wang, "Keystroke dynamics enabled authentication and identification using triboelectric nanogenerator array" Materials Today, vol. 21, No. 3, 7 pages, [Online], Available: http://www.sciencedirect.com/science/article/pii/S1369702117307642 Apr. 2018.

T. Zhang, R. Ramakrishnan, and M. Livny, "BIRCH: an efficient data clustering method for very large databases," ACM SIGMOD Record, vol. 25, No. 2, pp. 103-114, [Online], Available: https://doi.org/10.1145/235968.233324 Jun. 1996.

Y. Ashibani, D. Kauling, and Q. H. Mahmoud, "A context-aware au-thentication framework for smarthoAes," in 2017 IEEE 30th Canadian Conference on Electrical and Computer Engineering (CCECE), pp. 1-5, ISSN: null Apr. 2017.

H. F. Atlam and G. B. Wills, "An efficient security risk estimation technique for risk-based access control model for iot," Internet of Things, vol. 6, p. 100052 2019.

T. Floyd, M. Grieco, and E. F. Reid, "Mining hospital data breach records: Cyber threats to U.S. hospitals," in 2016 IEEE Conference on Intelligence and Security Informatics (ISI), , pp. 43-48 Sep. 2016.

Fu K., Kohno T., Lopresti D., Mynatt E., Nahrstedt K., Patel S., Richardson D., & Zorn B., Safety, Security, and Privacy Threats Posed by Accelerating Trends in the Internet of Things. http://cra.org/ccc/resources/ccc-led-whitepapers/, 9 pages, 2017.

(56) References Cited

OTHER PUBLICATIONS

E. Hayashi, S. Das, S. Amini, J. Hong, and I. Oakley, "CASA: Context-aware Scalable Authentication," in Proceedings of the Ninth Symposium on Usable Privacy and Security, ser. SOUPS ' 13. New York, NY, USA: ACM, 2013, pp. 3:1-3:10, event-place: Newcastle, United Kingdom. [Online], Available: http://doi.acm.org/10.1145/2501604.2501607 2013.

H. Khambhammettu, S. Boulares, K. Adi, and L. Logrippo, "A frame¬work for risk assessment in access control systems," Computers & Security, vol. 39, pp. 86-103, 27th IFIP International Information Security Conference. 2013.

P. E. Rauber, A. X. Falco, and A. C. Telea, "Visualizing Time-Dependent Data Using Dynamic t-SNE," p. 5 2016.

M. Wattenberg, F. Vigas, and I. Johnson, "How to Use t-SNE Effectively," Distill, vol. 1, No. 10, p. e2, [Online], Available: http://distill.pub/2016/misread-tsne Oct. 2016.

D. Hintze, E. Koch, S. Scholz, and R. Mayrhofer, "Location-based Risk Assessment for Mobile Authentication," in Proceedings of the 2016 ACM International Joint Conference on Pervasive and Ubiquitous Computing: Adjunct, ser. UbiComp '16. New York, NY, USA: ACM, 2016, pp. 85-88, event-place: Heidelberg, Germany. [Online], Available: http://doi.acm.Org/10.I 145/2968219.2971448 2016.

R. J. Hulsebosch, A. H. Salden, M. S. Bargh, P. W. G. Ebben, and J. Reitsma, "Context sensitive access control," in Proceedings of the tenth ACM symposium on Access control models and technologies, ser. SACMAT '05. Stockholm, Sweden: Association for Computing Machinery, Jun. 2005, pp. 111-119. [Online], Available: https ://doi.org/1 0.1145/1063979.1064000 2005.

D. A. Reynolds, "A Gaussian mixture modeling approach to text¬independent speaker identification." p. 1, [Online], Available: https://elibrary.ru/item.asp?id=5779793 1993.

Q. Wang and H. Jin, "Quantified risk-adaptive access control for patient privacy protection in health information systems," in Proceedings of the 6th ACM Symposium on Information, Computer and Communications Security, ser. ASIACCS 11. New York, NY, USA: Association for Computing Machinery, 2011, p. 406410. [Online], Available: https ://doi.org/1 0.1145/1966913.1966969 2011.

Extended European Search Report; EP App No. 21214497.6 May 20, 2022.

European Patent Office, Communication pursuant to Article 94(3) EPC for Appl. No. 21214497.6 dated May 7, 2024 (6 pages).

Ngoc Nguyen et al., Security and Management 2007, "Contextual Risk-based Access Control," Jan. 1, 2007 (7 pages).

\* cited by examiner (a) Frequency-based Features (b) Duration-based Features (c) Combined Features (a) Using Frequency-based Features (b) Using Duration-based Features (a) Using Frequency-based Features (b) Using Duration-based Features (c) Using Combintion Features

RISK-AWARE ACCESS CONTROL SYSTEM AND RELATED METHODS

CROSS REFERENCE TO RELATED APPLICATIONS

This is a continuation of U.S. application Ser. No. 17/129,334, filed Dec. 21, 2020, the content of which is hereby incorporated by reference.

TECHNICAL FIELD

The present disclosure relates generally to access control systems, and more particularly to a risk-aware access control system and related methods.

BACKGROUND

State-of-the-art access control mechanisms for cyber-physical systems lack the flexibility that would otherwise allow access control decisions to be associated with the dynamic context of the system. A cyber-physical system comprises a network of interacting cyber elements (e.g., data elements) and physical elements each with inputs and outputs in contrast to a standalone device.

Traditional authentication schemes based on a shared secret such as a password or personal identification number (PIN) code can be inadequate for some users whereas implicit authentication can be more usable and secure. Specifically, passwords set by some mobile users can be determined by simple guessing, inferred from smudge left on user screens, or stolen by malware. The sensors can be utilized to safeguard the security of cyber and physical assets in a multidimensional manner using, for example, contextual, behavioral, and biometric signatures. However, despite the convenience and success in recognizing behavioral patterns, state-of-the-art behavioral authentication does not completely eliminate false positives, and hence is not a risk-free solution. Furthermore, even if false positives can be completely eliminated, the state-of-the-art in implicit authentication for access control does not consider the contextual risk factors that may result in undesired consequences. For example, being able to view the contents of a sensitive/protected document administered at a healthcare organization may lead to privacy breaches, which in turn, may incur liabilities for the organization. Hence, implicit authentication calls for effective access control schemes that account for contextual risk factors. Recognition of a certain context can be effectively assisted by sensors, communication and data (i.e., storage and analytics), such as those of Internet of Things (IoT) devices and networks.

For at least the foregoing reasons, there is a need for improved access control system and related methods.

DETAILED DESCRIPTION

Figure 1:
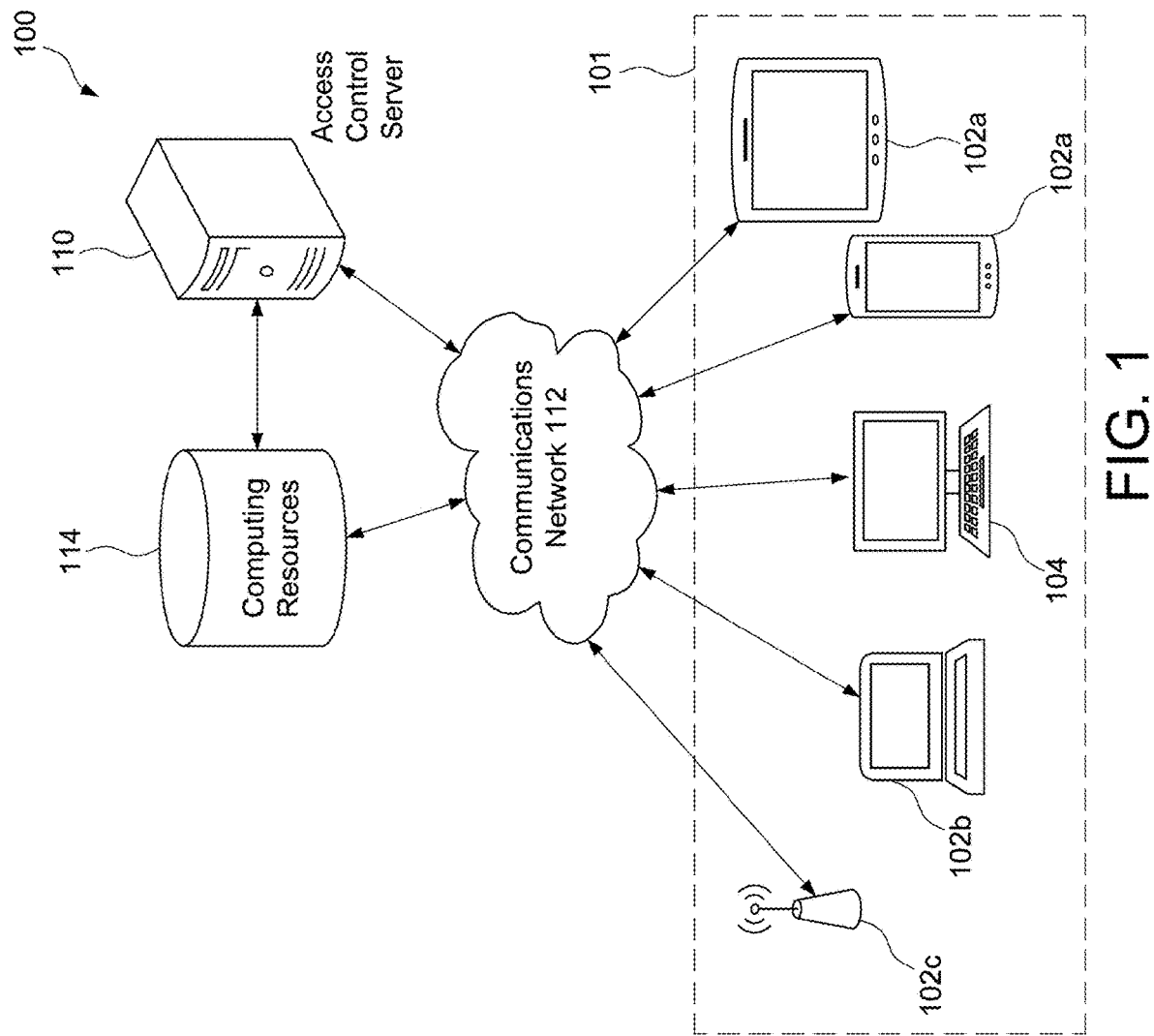
FIG. 1 is a simplified block diagram of a computing environment in which example embodiments of the present disclosure may be carried out.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

In accordance with one aspect of the present disclosure, there is a provided a method of risk-aware access control, comprising: detecting a request to perform an action with respect to two factors, the factors being of a factor type selecting people, devices, documents, and location, wherein the factors are of a different factor type; determining a coupling associated with the requested action based on the factors of the requested action; determining a risk level associated with the coupling; denying the requested action in response to a determination that the risk level does not match a security policy; and allowing the requested action in response to a determination that the risk level matches the security policy.

In some examples, the security policy is dependent on the requested action.

In some examples, the risk level associated with the coupling is a risk level of the coupling or a coupling feature derived from the coupling.

In some examples, the method comprises: determining a cluster of couplings in which the coupling is grouped (located) from a plurality of cluster of couplings using the factors of the requested action; and determining a risk level of the cluster using a predetermined risk level assigned to each cluster in the plurality of clusters.

In some examples, the risk level associated with the coupling is the risk level of the cluster in which the coupling is grouped (located).

In some examples, the risk level is one of low, medium, or high; and wherein the requested action is allowed when the requested action is associated with a cluster having a low risk level, the requested action is denied when the requested action is associated with a cluster having a high risk level, and a determination as to whether to allow the requested action is based on a risk level of the coupling or a coupling feature derived from the coupling.

In some examples, the requested action is denied in response to a determination that the coupling is not grouped (located) within a cluster.

In some examples, the method further comprises: causing a user authentication challenge in response to denying the requested action; and allowing the requested action in response to a successful user authentication challenge.

In some examples, the method further comprises: causing a security action in response to an unsuccessful user authentication challenge.

In some examples, the security action comprises one of sending an electronic message to a designated messaging address, adjusting a session security level by a predetermined amount or to a predetermined amount, locking a computing device associated with the requested action, ending a session of a user associated with the requested action, or performing a partial or complete data wipe of a memory of a computing device associated with the requested action.

In some examples, the method further comprises: causing a security action in response to an unsuccessful user authentication challenge.

In some examples, the security action comprises one of sending an electronic message to a designated messaging address, adjusting a session security level by a predetermined amount or to a predetermined amount, locking a computing device associated with the requested action, ending a session of a user associated with the requested action, or performing a partial or complete data wipe of a memory of a computing device associated with the requested action.

In some examples, the coupling is at least one of duration-based and frequency-based.

In some examples, the coupling is frequency-based.

In some examples, the coupling is duration-based and frequency-based.

In accordance with another aspect of the present disclosure, there is a provided a computing device having a processor and a memory coupled to the processor, the memory having tangibly stored thereon executable instructions for execution by the processor, wherein the executable instructions, in response to execution by the processor, cause the computing device to perform the methods described herein.

In accordance with a further aspect of the present disclosure, there is provided a non-transitory machine-readable medium having tangibly stored thereon executable instructions for execution by a processor of a computing device, wherein the executable instructions, in response to execution by the processor, cause the computing device to perform the methods described herein.

Authentication System

Reference is first made to FIG. 1 which shows in simplified block diagram form of an authentication system 100 in which example embodiments of the method of the present disclosure may be carried out. The authentication system 100 comprises a communications network 112 that enables a plurality of communication devices 101 to exchange data. The communication devices 101 may connect to one or more servers 110 (only one of which is shown in FIG. 1) and/or one or more computing resources 114 coupled to the communications network 112. The computing resources 114 may be databases. The servers 110 and computing resources 114 may be locate behind a firewall (not shown).

The communications network 112 may be any type of network capable of enabling a plurality of communication devices 101 to exchange data such as, for example, a local area network (LAN), such as a wireless local area network (WLAN) such as Wi-Fi™, used in a work office environment, a wireless personal area network (WPAN), such as Bluetooth™ based WPAN, a wide area network (WAN), a public-switched telephone network (PSTN), or a public-land mobile network (PLMN), which is also referred to as a wireless wide area network (WWAN) or a cellular network. The communications network 112 may comprise a plurality of the aforementioned network types coupled via appropriate methods known in the art.

The communication devices 101 and servers 110 may communicate securely using, for example, Transport Layer Security (TLS) or its predecessor Secure Sockets Layer (SSL). TLS and SSL are cryptographic protocols which provide communications security over the Internet. TLS and SSL encrypt network connections above the transport layer using symmetric cryptography for privacy and a keyed message authentication code for message reliability. The communication devices 101 and servers 110 are provided with encryption key(s) for secure communications using TSL or SSL, which are typically stored in persistent memory of the communication devices 101 and servers 110.

The communication devices 101 may comprise one or more mobile wireless communications devices ("mobile devices") 102, one or more personal computers 104, one or more security devices 106 or a combination thereof. The mobile devices 102 may comprise, but are not limited to, handheld wireless communications devices represented by reference 102a, such as smartphones or tablets, laptop or notebook computers (also known as a netbook or ultrabook computer depending on the device capabilities) represented by reference 102b, or a combination thereof. The security devices 106 may be a security access device 102c such as a security access terminal, security card (e.g., smart card)

reader, biometric scanner/reader (e.g., voice scan/print, face scan/print, finger or palm scan/print, gait scan/print etc.), camera (still or video), or other suitable device.

The mobile devices 102 may include a vehicle computing device (not shown). The mobile devices 102 may include devices equipped for cellular communication through PLMN or PSTN, mobile devices equipped for Wi-Fi™ communications over WLAN or WAN, or dual-mode devices capable of both cellular and Wi-Fi™ communications. The mobile devices 102 may also be equipped for Bluetooth™ and/or NFC (near-field communication) communications.

The computers 104 and servers 110 may include any computing device equipped for communicating over LAN, WLAN, Bluetooth, WAN, PSTN, PLMN, or any combination thereof. For example, the computers 104 may be a personal computer such as a desktop computer. Although FIG. 1 illustrates the authentication system 100 as having a certain number of communication devices 101 and servers 110, this is for illustrative purposes only. The authentication system 100 may comprise any number of communication devices 101 and servers 110 of the various types.

The servers 110 may be connected to the computing resources 114, either directly or through the communications network 112. The computing resources 114 comprise a plurality of data files that may be physically located either locally or remotely from the servers 110. The computing resources 114 may be a module of the servers 110. The servers 110 and computing resources 114 may be implemented in a virtualized environment such that, although depicted as a single block in FIG. 1, the servers 110 and computing resources 114 may be implemented across a number of devices in a cloud computing environment.

Figure 2:
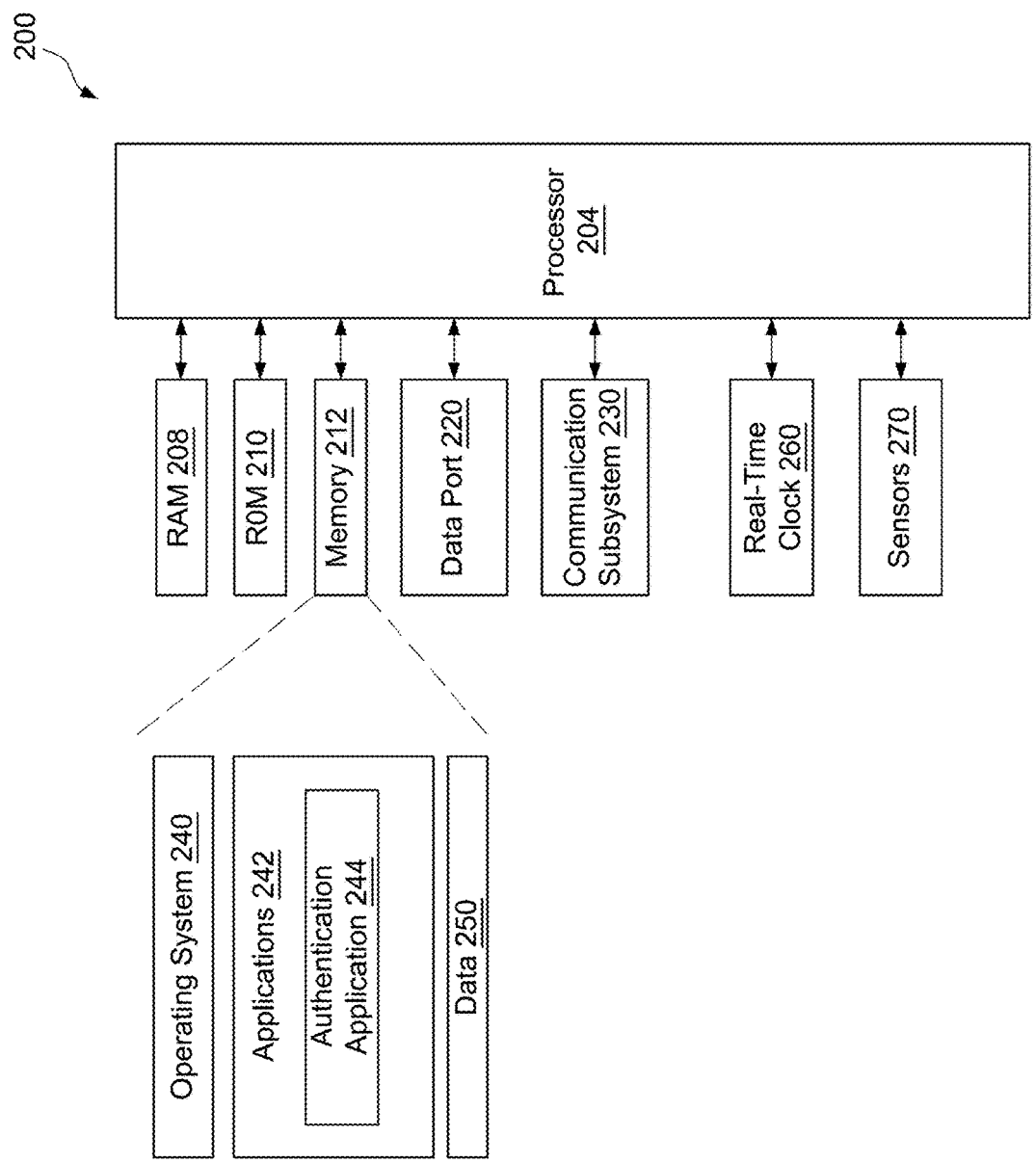
FIG. 2 is a simplified block diagram of a computing device suitable for practicing example embodiments of the present disclosure.

Referring now to FIG. 2 an example of a computing device 200 suitable for practicing example embodiments of the present disclosure. The computing device 200 may be a communication device 101 or a server 110. The computing device 200 comprises at least one processor 204 which controls the overall operation of the computing device 200. The processor 204 is coupled to a plurality of components via a communication bus (not shown) which provides a communication path between the components and the processor 204. The computing device 200 also comprises a Random Access Memory (RAM) 208, Read Only Memory (ROM) 210, a persistent (non-volatile) memory 212 which may be flash erasable programmable read only memory (EPROM) ("flash memory") or other suitable form of memory, a data port 220 such as a serial data port (e.g., Universal Serial Bus (USB) data port), communication subsystem 230, a real-time clock (RTC) 260, and sensors 270.

The communication module 230 may comprise any combination of a long-range wireless communication module, a short-range wireless communication module, or a wired communication module (e.g., Ethernet or the like). The long-range wireless communication module comprises one or more radio frequency (RF) transceivers for communicating with a radio access network (e.g., cellular network). The RF transceivers may communicate with any one of a plurality of fixed transceiver base stations of a cellular network within its geographic coverage area. The long-range wireless communication module may also comprise a wireless local area network (WLAN) transceiver for communicating with a WLAN via a WLAN access point (AP). The WLAN may comprise a Wi-Fi wireless network which conforms to IEEE 802.11x standards (sometimes referred to as Wi-Fi®) or other communication protocol. The short-range communication module may comprise devices, associated circuits and components for providing various types of short-range wireless communication such as Bluetooth™, RFID (radio frequency identification), near field communication (NFC), IEEE 802.15.3a (also referred to as UltraWideband (UWB)), Z-Wave, ZigBee, ANT/ANT+ or infrared (e.g., Infrared Data Association (IrDA) communication).

The communication module 230 of the computing device 200 may comprise one or more antennas, a processor such as a digital signal processor (DSP), and local oscillators (LOs). The specific design and implementation of the communication module 230 is dependent upon the communication technologies implemented by the computing device 200. Data received by the computing device 200 may be decompressed and decrypted by a decoder (not shown).

Operating system software 240 executed by the processor 204 is stored in the persistent memory 212 but may be stored in other types of memory devices, such as ROM 208 or similar storage element. A number of applications 242 executed by the processor 204 are also stored in the persistent memory 212. The applications 242 may include an authentication application 244. Other applications are also stored in the memory 126. The authentication application 244, in response to execution by the processor 204, allows the computing device 200 to perform the methods described herein. In other embodiments, the authentication application 244 may be stored remotely, for example on a server 110, for cloud-based deployment.

The authentication application 244 may be capable of being operated by the computing device 200 while other applications are in operation, for example, by running in the background. The authentication application 244 may be configured to be able to collect data from other running applications regarding user actions and use the collected data to carry out the methods described herein. The authentication application 244 may be part of the operating system software 240, for example, a part of security software that performs authentication, an inactivity countdown timer and lockout, or a separate application.

The authentication application 244 detects user actions, store metadata pertaining to user actions, and cause (e.g., prompt) user authentication challenges (e.g., re-authentication actions). The authentication application 244 may continually monitor user actions and requested user actions throughout a session, determine whether a user authentication challenge is appropriate based on the user actions and/or requested user actions, and adjust a session security level based on user actions during a session in addition to known features of an authentication method. The operation of such features and functions is described more fully below.

Risk-Aware Access Control Method

Figure 3:
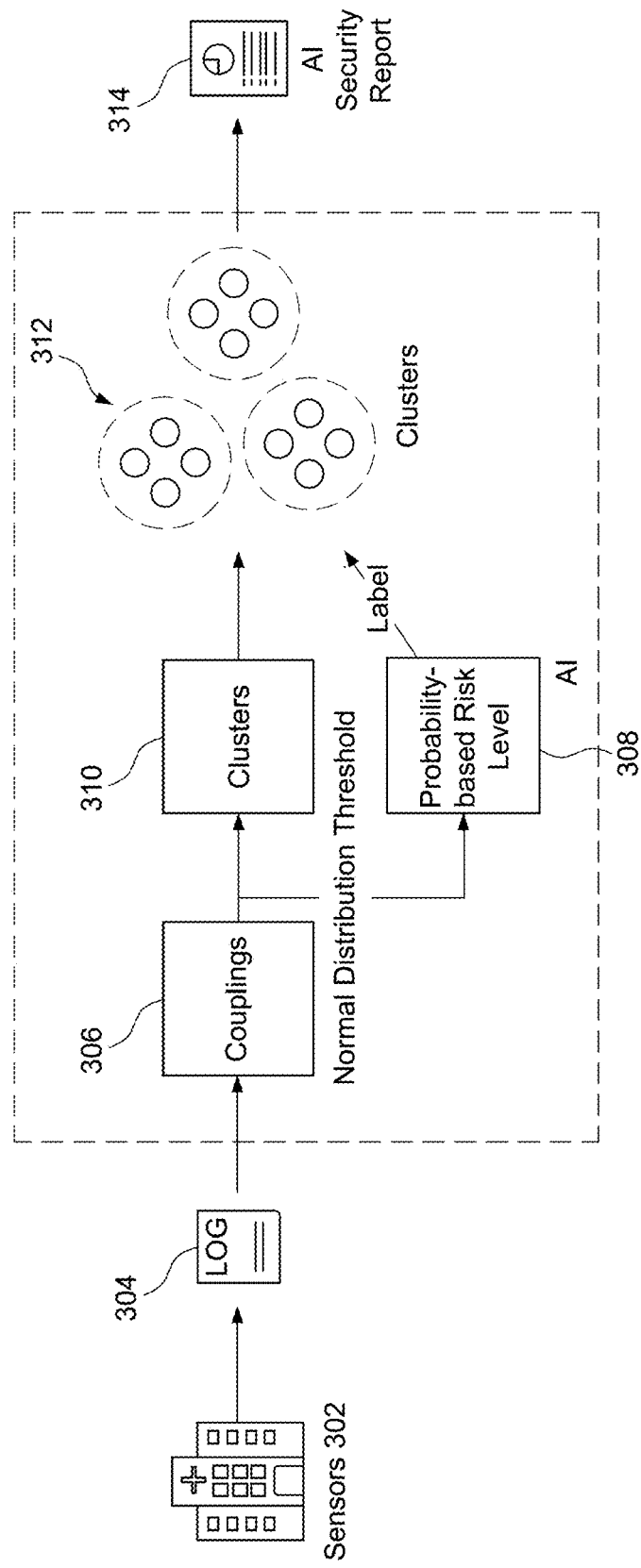
FIG. 3 is a schematic diagram of the risk-aware access control method in accordance with the present disclosure.

Referring to FIG. 3, an overview of the risk-aware fine-grained access control method of the present disclosure will be described. A plurality of sensors 302 are configured to detect and record events with respect to physical and cyber elements, referred to collectively as "factors". An "event" is a collection of actions which are substantially simultaneous/contemporaneous and which share a common factor, such as a document or a location, or a person. A statistical (i.e., automated) method of forming events is described below. Thus, an event is a collection of actions. A factor may be one of four types: people (users), devices, documents, (physical) locations. There are multiple instances of each type of factor, e.g. multiple users, multiple devices, multiple documents and multiple locations. An event is an interaction between two factors of a different type. An event may be a document-device interaction, a location-device interaction, a device-people interaction, a location-people interaction, a document-people interaction, or a location-document interaction. Each event comprises an action. Non-exhaustive examples of actions include person entering a location, a person exiting a location, a person gets a device (e.g., picks it up in a location), a person holds a device (e.g., continues to retain device while moving between locations), a person accesses a document (e.g., using a held device), a device enters a location (e.g., carried by a person who also enters that location), and a device exist a location (e.g., carried by a person who also enters that location). Conventionally, persons are part of actions of interest because the actions of people are typically the risky actions. However, the teachings of the present disclosure considered other types of actions, such as those relating to documents and device, that may not involve people.

The sensors 302 may be part of an IoT device, mobile communication device (e.g., smartphone) or other type of suitable electronic device. The sensors 302 may be the same or different. The sensors 302 may form a sensor network. The sensors 302 are configured to detect different types of interaction between various factor types. The sensor type and configuration may vary based on the host device, the entities being monitored, and/or the actions being monitored.

An event record is added to an event log (also known as an action log) 304 in response to detection of an event. The event log may be stored as a database. The event log comprises data describing physical activity such as entering or exiting a room as well as cyber activity (e.g., data activity) such as logging in a device or accessing a document. When users or devices enter or exit a specific location, an identifier (ID) of the room and the ID of the user is logged with a timestamp. If a user attempts to access a document, the device on which the access was attempted first requests grant for access, and this attempt is logged.

Figure 4:
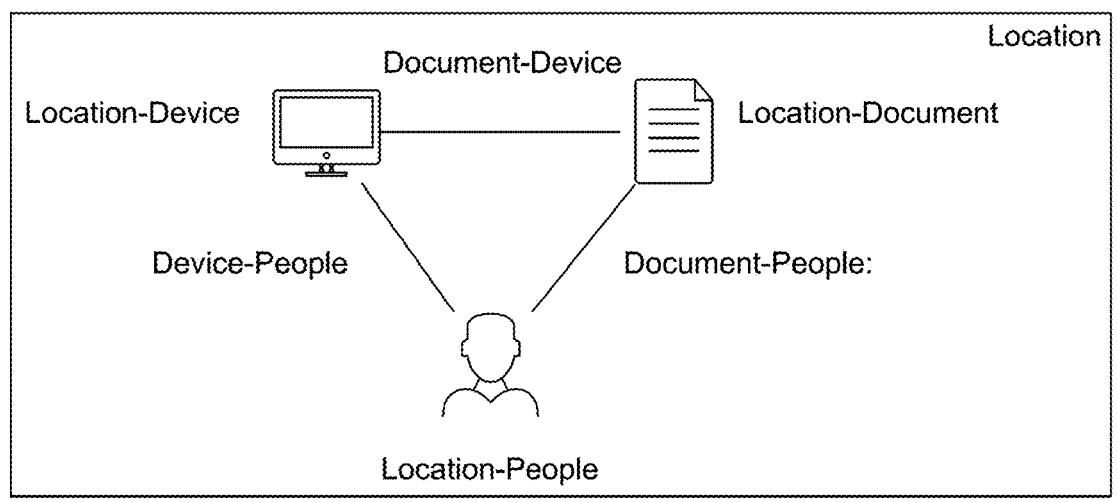
FIG. 4 is a schematic diagram illustrating coupling types accordance with the present disclosure.

Couplings 306 between factors in events are determined from the event logs. A coupling is a relationship between disparate factors in an event. A coupling forms between different factor types because each factor contributes to a single event. An example is shown FIG. 6, where two coupling features are exhibited, both participating in the same event. The couplings 306 represent contextual information in the form of relationships between factors. The various types of events are illustrated in FIG. 4: document-device, location-device, device-people, location-people, document-people, or location-document. The present disclosure uses couplings 306 to improve risk assessment because the risk level of an event is determined by context as well the event itself. Couplings 306 can be determined based on duration-based features, frequency-based features or a combination thereof. The duration-based features and frequency-based features may be combined, for example, using concatenation or other suitable techniques. The couplings 306 may be defined by a numerical coupling value which, in some examples, may range between 0 and 1. The lower a coupling value, the more infrequent or "rare" the coupling and, therefore, the more risky the event, because it is more "unusual".

The coupling values are normalized via a normal distribution threshold, stored in memory in coupling matrices, and a risk level 308 is determined based on the mean value and standard deviation of each coupling value. The granularity of the risk level may vary. In some examples, the risk level may be determined to be one of "low risk", "medium risk" or "high risk". In other examples, the risk level may be determined to be "low risk", "low medium risk", "medium low risk", "medium risk", "medium high risk", "high medium risk" or "high risk". The risk level 308 of each coupling 306 is stored in memory.

Figure 5:
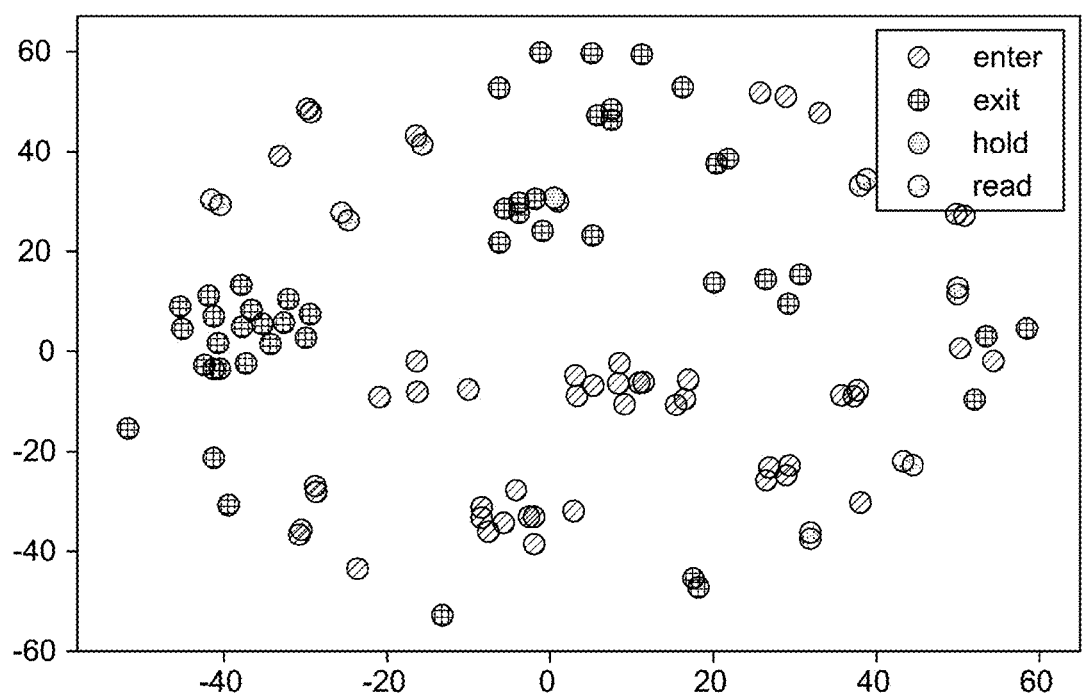
FIG. 5 is a plot of the distribution of events in an example event log using a T-distributed Stochastic Neighbor Embedding (t-SNE).

Clustering of the couplings 306 is also performed to determined interaction patterns between factors by forming clusters 310 using a clustering algorithm that uses the couplings 306 as input. FIG. 5 is a plot of the distribution of events in an example event log using a T-distributed Stochastic Neighbor Embedding (t-SNE) and shows how events in an event log may exhibit clustering. FIG. 5 maps the multidimensional features of events onto a two-dimensional space, and how events can be formulated as moving these objects (i.e. people, documents and devices) across different locations over time. Thus, an event or a state machine may be defined as a combination of time, location and a set of objects in this space.

The clustering algorithms may be based on artificial intelligence techniques. Examples of suitable clustering algorithms that may be applied include Gaussian mixture models (GMM) described, for example, in D. A. Reynolds, "A Gaussian mixture modeling approach to text-independent speaker identification." p. 1, 1993, https://elibrary.ru/item.asp?id=5779793, Agglomerative Hierarchical described, for example, in T. Zhang, R. Ramakrishnan, and M. Livny, "BIRCH: an efficient data clustering method for very large databases," ACM SIGMOD Record, vol. 25, no. 2, pp. 103-114, June 1996, https://doi.org/10.1145/235968.233324, and DBSCAN described, for example, in M. Ester, H.-P. Kriegel, J. Sander, and X. Xu, "A Density-Based Algorithm for Discovering Clusters in Large Spatial Databases with Noise," KDD'96: Proceedings of the Second International Conference on Knowledge Discovery and Data Mining, August 1996, pages 226-231. The content of these publications being incorporated herein by reference. The purpose of the clustering is to cluster features in the form of couplings, which can subsequently be labelled with appropriate risk levels. The objective of the clustering algorithm is to form the least possible number of clusters where within each cluster coexistence of high and low risk patterns is avoided.

After the computation of couplings 306, the risk levels 308 of the couplings 306, and forming clusters 310 of couplings 306, the risk level of each cluster 308 is calculated based on the risk level of the couplings 306 in that cluster 308, for example, the number of high, medium and low risk couplings 306 in that cluster 308. Each cluster is labeled according to cluster risk level to generate risk-rated clusters 312.

The risk of an entire event log can be determined by the same methodology described above, and a security report 314 which provides overall risk information generated for an information technology (IT) administrator, security expert or other interested party.

Example Embodiment

An example embodiment for calculating couplings, risk levels of couplings, clusters of couplings, and the risk level of each cluster from event logs will now be described. As mentioned above, couplings can be determined based on duration-based features, frequency-based features or a combination thereof. Duration denotes how long two factors spend time with each other. Frequency denotes how many times two factors encounter each other. In the present example, couplings are determined based on duration-based features and frequency-based features.

The first step in determining the coupling values is to determine a coupling distribution using Equation (1) which has binary and discrete values, and these are represented in matrices as shown in Equation (2):

$$\delta_{a_i,b_j}(k) = \begin{cases} 1 & \text{if } a_i, b_j \in E_k \\ 0 & \text{otherwise} \end{cases} \quad (1)$$

$$\begin{bmatrix} \delta_{a_1,b_1}(k) & \delta_{a_1,b_2}(k) & \cdots & \delta_{a_1,b_{N_B}}(k) \\ \delta_{a_2,b_1}(k) & \delta_{a_2,b_2}(k) & \cdots & \delta_{a_2,b_{N_B}}(k) \\ \vdots & \vdots & \vdots & \vdots \\ \delta_{a_{N_A},b_1}(k) & \delta_{a_{N_A},b_2}(k) & \cdots & \delta_{a_{N_A},b_{N_B}}(k) \end{bmatrix} \quad (2)$$

where ... $a_i$, $b_j$ are elements from sets of the factors Ppl, Dev, Doc, and Loc extracted from the event log(s), Ppl={$p_1$, $p_2$, $p_3$, ..., $p_n$} is the set of people factors appearing in the event log(s), Dev={$dev_1$, $dev_2$, $dev_3$, ..., $dev_n$}, is the set of device factors appearing in the event log(s), Doc={$doc_1$, $doc_2$, $doc_3$, ..., $doc_n$} is the set of document factors appearing in the event log(s), Loc={$loc_1$, $loc_2$, $loc_3$, ..., $loc_n$} is the set of location factors appearing in the event log(s), $E_k$ is the $k^{th}$ event which is defined as a collection of the elements from various sets, and $\delta_{a_i,b_j}(k)$ is the coupling distribution. Ppl, Dev, Doc, and Loc are the coupling factors.

Next, the number of times interactions (events) occurred between couplings in A and B, wherein A and B are any two of the four sets of factors Ppl, Dev, Doc, or Loc, and the total duration of the interactions (events) between couplings in A and B are determined from the distributions using Equations (3) and (4), respectively:

$$Freq_{a_i,b_j} = \frac{1}{2} \sum_{k=k_{start}}^{k_{end}-1} \left| \delta_{a_i,b_j}(k+1) - \delta_{a_i,b_j}(k) \right| \quad (3)$$

$$Dur_{a_i,b_j} = \sum_{k=k_{start}}^{k_{end}} \delta_{a_i,b_j}(k) \cdot T_{E_k} \quad (4)$$

where $Freq_{a_i,b_j}$ is the number of times that elements $a_i$ and $b_j$ occur together, $Dur_{a_i,b_j}$ is a duration of the occurrence of time that elements $a_i$ and $b_j$ occur together, the time period of the distribution is determined by the tuple ($k_{start}$, $k_{end}$), and $T_{Ek}$ indicates the duration of each interaction (event).

Next, coupling values are determined using Equations (5) and (6) for frequency and duration, respectively:

$$C_{a_i,b_j}^{Freq} = \frac{Freq_{a_i,b_j}}{\max_i Freq_{a_i,b_j}} \quad (5)$$

$$C_{a_i,b_j}^{Dur} = \frac{Dur_{a_i,b_j}}{\max_i Dur_{a_i,b_j}} \quad (6)$$

where $C_{a_i,b_j}^{Freq}$ is a frequency-based normalized coupling value for the elements $a_i$, $b_j$, and $C_{a_i,b_j}^{Dur}$ is a duration-based normalized coupling value for the elements $a_i$, $b_j$.

Figure 6:
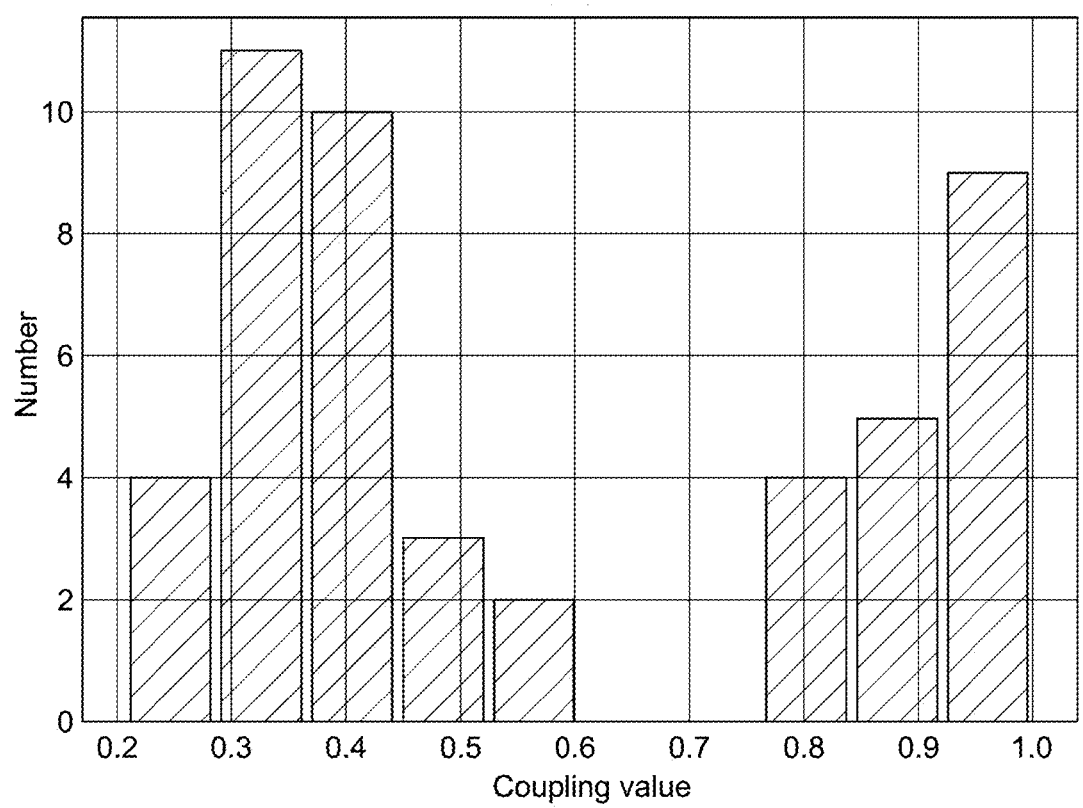
FIG. 6 is an example distribution of coupling values in a coupling matrix.

Each coupling value varies between 0 and 1. The distribution of coupling values in a coupling matrix may vary widely depending on the relationship between the various factors. FIG. 6 is an example distribution of coupling values in a coupling matrix illustrating that coupling distribution in a matrix can be skewed. When a factor interacts ("couples") with other factors equally, its couplings will approach or equal 1. If two factors interact less frequently, the coupling values will approach or equal 0. When the coupling value is close to 1, the risk level associated with the coexistence of two factors is low. In contrast, when the coupling value is close to 0, the risk level associated with the coexistence of two factors is high.

Equations (5) and (6) asymmetrically normalize the coupling values to enable comparability between different coupling values. For instance, applying Equations (5) and (6), $C_{A,B}$ is applied instead of $C_{B,A}$ in case the variance of the elements over B is greater than those in A. A coupling matrix for the frequency-based normalized coupling values and the duration-based normalized coupling values is generated, each coupling matrix having the following format with the couplings can be abstracted as $C_{a_i,b_j}$:

$$\begin{bmatrix} C_{a_1,b_1} & C_{a_1,b_2} & \cdots & C_{a_1,b_{N_B}} \\ C_{a_2,b_1} & \delta_{a_2,b_2} & \cdots & C_{a_2,b_{N_B}} \\ \vdots & \vdots & \vdots & \vdots \\ C_{a_{N_A},b_1} & C_{a_{N_A},b_2} & \cdots & C_{a_{N_A},b_{N_B}} \end{bmatrix}$$

The frequency and duration coupling matrices represent coupling values for each factor pair (e.g., person-document, person-device, person-location, device-location, etc.) in the considered event logs. As the event logs contain four factor types, namely people, document, device and location, up to six couplings can be obtained from an event: $C_{device,location}$, $C_{device,document}$, $C_{document,location}$, $C_{people,location}$, $C_{people,device}$, and $C_{people,document}$. As mentioned earlier, coupling values are asymmetric.

To make coupling values comparable, the differences between the elements which have larger variance is reduced by determining (e.g., generating) a coupling feature for each coupling in each coupling matrix (i.e., in each event). Generally, a "feature" is an identified, numerical datum associated with an event or object, and the totality of "features" constitute the "knowledge" or "observation set" of the event or object as would be readily understood by data and information scientists. Specifically, a "coupling feature" extracted from an event in the present disclosure means such a feature (observation, fact, etc.) about the event—not a direct observation of the event but computed statistically from the ensemble of contextual actions involving those factors. If an event be considered as a collection of actions (interactions) between factors of various types (e.g., people, locations), then a coupling feature of the event is a number representing the unusualness of the co-occurrence of two factor types (e.g., people, locations) within that event.

Equation (7), below, quantifies the data relationship that when multiple individuals of the same kind of factor are involved in an event (e.g., three people and two documents all in the same event) then the feature for that coupling is the minimum coupling value for each coupling pair. If there are not multiple individuals (e.g., there is only one person and one location in an event), then the coupling value of those two becomes immediately the coupling feature of that event. Coupling features may be determined for each coupling pair in each coupling matrix in accordance with Equation (7):

$$F_n^{A,B} = \min_{a_i,b_j \in E_n} C_{a_i,b_j} \quad (7)$$

wherein $F_n^{A,B}$ is the A, B coupling feature extracted from the $n^{th}$ event ($E_n$).

A feature matrix of coupling features is generated for each coupling matrix, the feature matrices having the same size as the coupling matrices.

Figure 7:
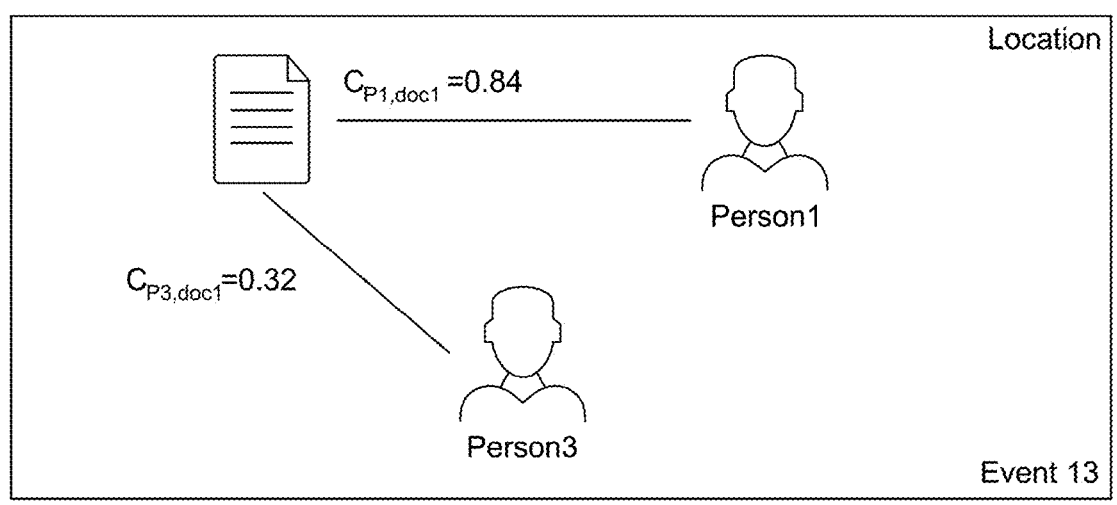
FIG. 7 is an example coupling feature.

The coupling features ensures that the impact of higher risk elements will not be alleviated by lower risk elements when multiple coupling values are of the same type by using the minimum coupling value, i.e., the higher risk value. This provides a more conservation and secure solution. For instance, given $C_{a_i,b_k} < C_{a_j,b_k}$, when $a_i$ and $a_j$ appear with $b_k$ at the same time, $F_n^{A,B} = C_{a_i,b_k}$. Specifically, for two events $E_i$ and $E_j$, viewed as sets of actions, if $E_{i\,is}$ subset or equals $E_j$, then the risk of $E_t$ (Risk $(E_t)$) is less than or equal to risk of $E_j$ (Risk $(E_j)$), i.e. Risk $(E_j) \leq$ Risk $(E_j)$. FIG. 7 illustrates an example coupling feature in which Person 1 ($p_1$) and Person 3 ($p_3$) coexist with Document 1 ($doc_1$) in Event 13 ($E_{13}$). The couplings $C_{p1,doc1}$ and $C_{p3,doc1}$ are determined according to historical records and $C_{p1,doc1} > C_{p3,doc1}$. Therefore, for the illustrate event the coupling feature event $F_{13}^{Ppl,Doc}$ has the value of the coupling $C_{p3,doc1}$.

Next, a risk level is assigned to each coupling feature in each feature matrix. The risk level of each coupling feature in each feature matrix is determined, $R_{a_i,b_j}^{Freq}$ for the risk level of the frequency-based normalized coupling features for the elements $a_i$, $b_j$, $R_{a_i,b_j}^{Dur}$ for the risk level of the duration-based normalized coupling features for the elements $a_i$, $b_j$, and $R_{a_i,b_j}^{Combined}$ for the risk level of the combined normalized coupling features for the elements $a_i$, $b_j$. As mentioned above, in some examples the risk level may vary from 1 to 3. The risk level of each coupling feature in each feature matrix is determined in accordance with a risk policy function or a defined risk association/mapping between factor pairings in the event logs. The formulation of the risk policy function or risk association/mapping is outside the scope of the present disclosure. For the purpose of the present disclosure, any risk policy function that assigns risk levels to the coupling features may be adopted. The assignment of risk to coupling features is an option or parameter, of the method provided that larger coupling feature values represent lower risk. Coupling features are mapped to risk levels, in the present example, high, medium or low risk. Each risk level is assigned a value, in the present example, 3 for high risk, 2 for medium risk, and 1 for low risk. A threshold is set for each risk level and mean value binning is applied over the coupling values in the respective coupling matrix in accordance with the following equations:

$$\text{Threshold}_{High} = \mu - \alpha \cdot \sigma \quad (8)$$

$$\text{Threshold}_{Low} = \mu + \alpha \cdot \sigma \quad (9)$$

wherein μ is the mean, σ the standard deviation of the feature matrix values, and α is a scaling parameter set by policy. Medium risk-level is assigned to coupling values between the high-risk threshold and low-risk threshold.

Next, couplings are clustered into groups known as clusters using the risk level of the associated coupling features using a clustering algorithm as mentioned above. It is noted that non-clustered couplings are less observed and are therefore considered to pose higher risk. The clustering algorithm uses risk level of coupling features as a distance metric in cluster formation so that couplings having similar risk are located in the same cluster.

A cluster risk level (CRV) may be determined using Equation (10) as follows:

$$CRV = \frac{N_H \cdot C_H + N_M \cdot C_M + N_L \cdot C_L}{N_H + N_M + N_L} \quad (10)$$

wherein $N_H$, $N_M$ and $N_L$ denote the number of high, medium and low risk coupling features respectively, $C_H$, $C_M$ and $C_L$ are values are assigned to high, medium and low risk levels which, in the present example, correspond to 3, 2 and 1 respectively, with 3 denoting a higher risk.

Next, the CRV values are mapped to risk labels which, in the present example, are one of Low (L), Low-Medium (LM), Medium-Low (ML), Medium (M), Medium-High (MH), High-Medium (HM), and High (H) risk levels according to Table I below.

TABLE I

| Map Cluster Risk Values to Risk Levels | | | | | | | |
|---|---|---|---|---|---|---|---|
| CRV | 1 | 1.01-1.49 | 1.50-2.00 | 2 | 2.01-2.49 | 2.50-2.99 | 3 |
| Risk Levels | L | LM | ML | M | MH | HM | M |

In use, requested actions are allowed or denied based on the risk level of the cluster to which the requested action is determined to belong in accordance with a security policy for allowing requested actions, the formulation of which is outside the scope of the present disclosure. In the present example, if a cluster is labeled high risk, all requested actions which are determined to belong to in this cluster are denied. Otherwise, requested actions which are determined to belong to the clusters with medium or low risk labels contain the actions that may be allowed. The decision whether to allow a requested action which is determined to belong to a medium risk cluster (e.g., LM, ML, M, MH, and HM) depends on the coupling feature-based risk level for the requested action. If a cluster is labeled low risk, all requested actions which are determined to belong to in this cluster are allowed.

Numerical results of clustering and labeling in accordance with a numerical evaluation of embodiments of the present disclosure in a medical setting will now be briefly described. The action logs used in the numerical evaluation contain one device. Therefore, the available features are Location-People, Location-Device, Location-Document, and Document-People. It is noted that only one device exists in the action log. Therefore, only $C_{document,location}$, $C_{people,location}$, $C_{people,device}$, and $C_{people,document}$ are used in the evaluations. The results are presented using duration-based features, frequency-based features and the combined (i.e., frequency and duration-based) features. Three different clustering algorithms are applied, which are Gaussian mixture models (GMM), Agglomerative Hierarchical, and DBSCAN. The target of the numerical evaluation was to cluster these features (couplings) and label the clusters with risk levels. The aim of the clustering algorithm was to form the least possible number of clusters where within each cluster coexistence of high and low risk patterns is avoided. In the numerical evaluation n, the circumstances under which people may stay in a room for a long time while they enter and exit other rooms with high frequency are considered. Therefore, frequency-based features are also expected to affect the risk assessment. Since the duration-based coupling features and frequency-based features show distinctive perspective of the action logs, the evaluation employs the combined features defined as concatenation of two features. Clustering results, and risk value results are generated by using three different features. A visualization of features is provided followed by feature-by-feature risk of each cluster in the event logs. Results under different clustering algorithms are discussed and cluster risk levels are presented.

Figure 9A:
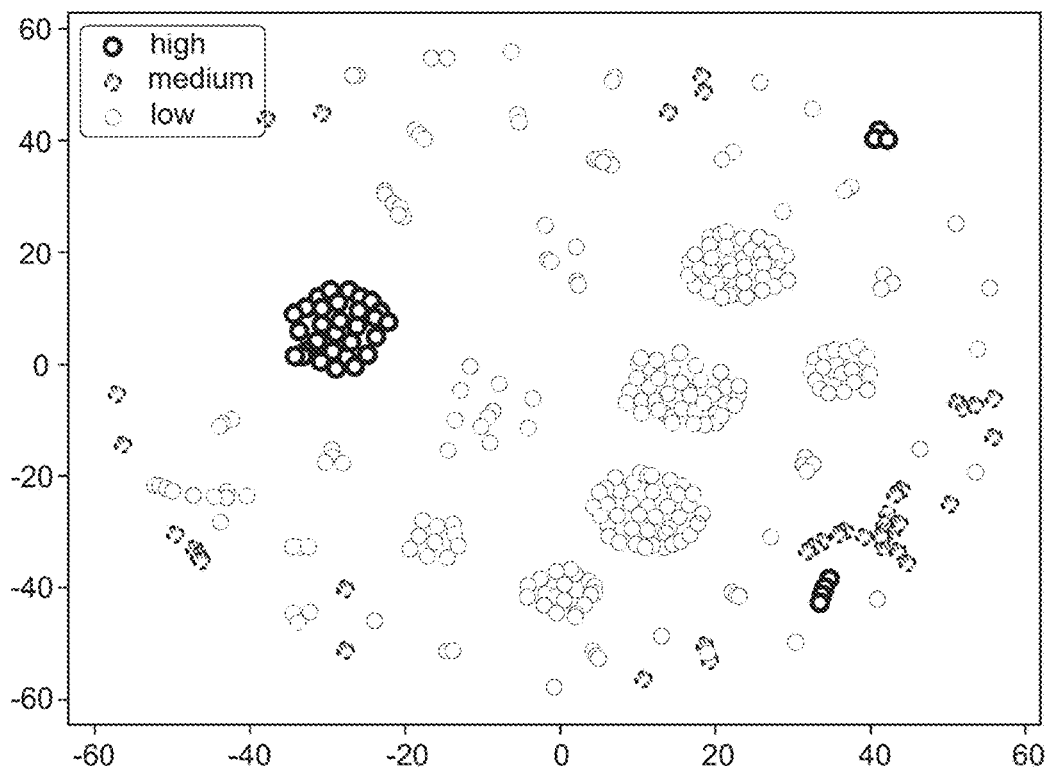
FIGS. 9(*a*)-(*c*) illustrate the risk for coupling features visualized via using t-SNE for frequency-based features, duration-based features and combined features in accordance with a numerical evaluation of embodiments of the present disclosure.
Figure 9B:
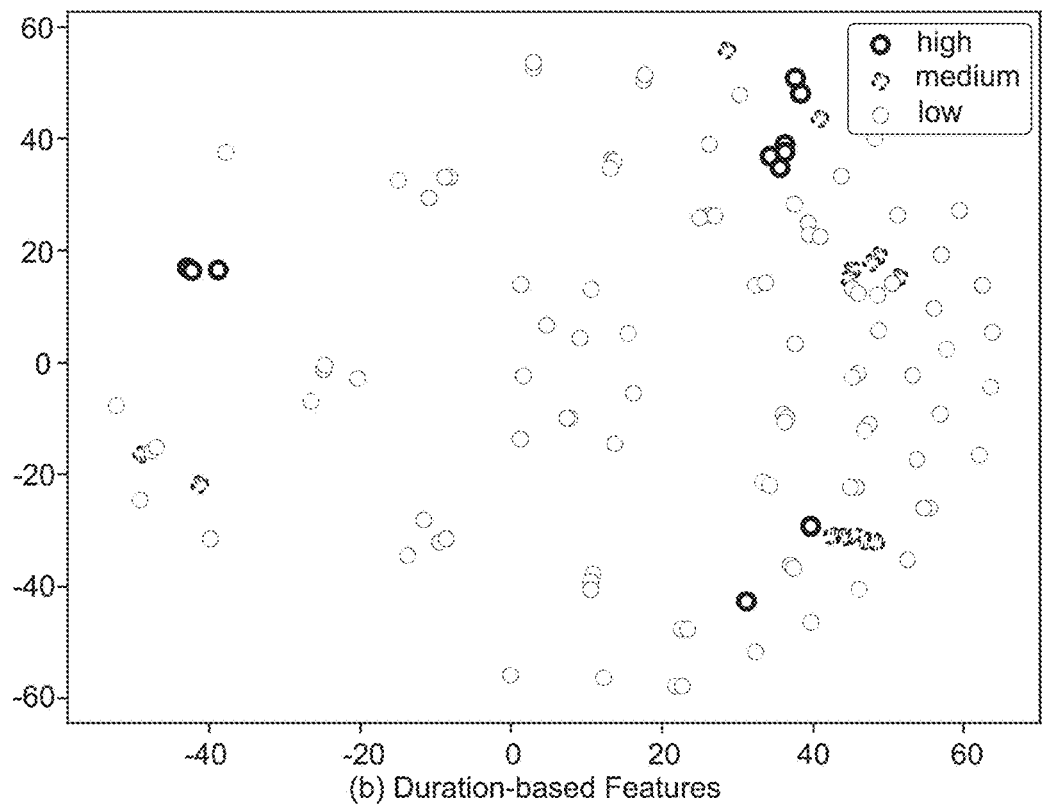
Figure 9C:
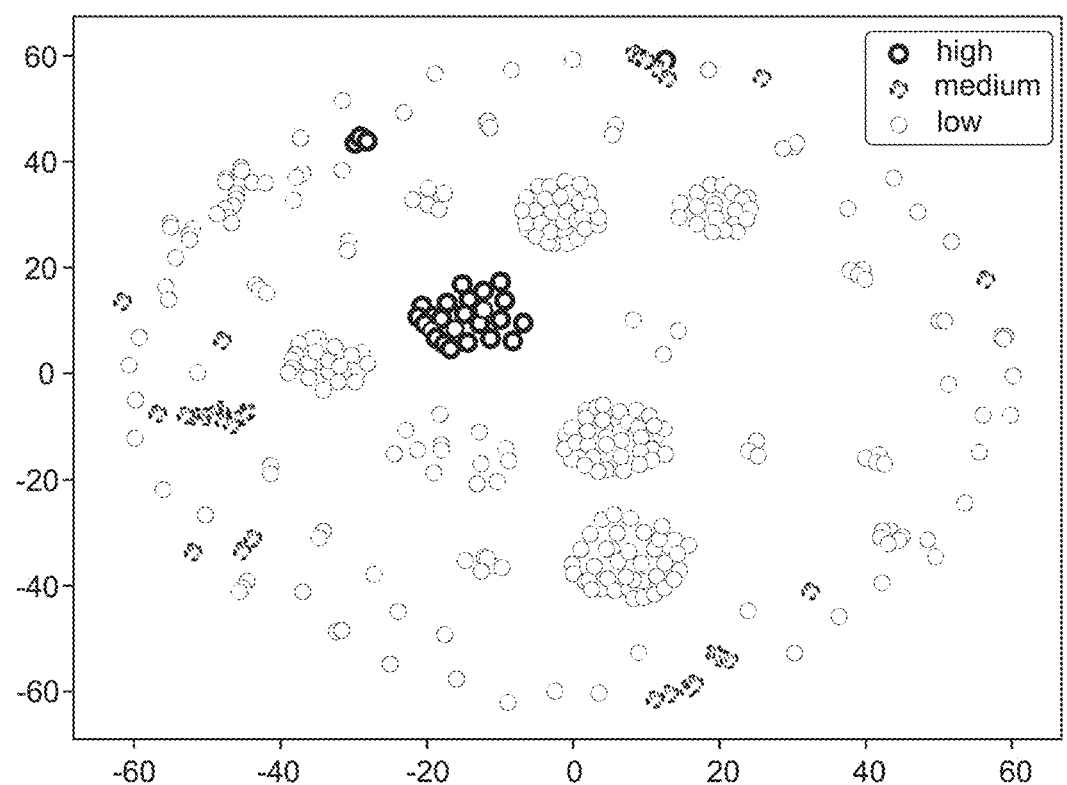

FIGS. 9(a)-(c) illustrate the risk for coupling features visualized via using t-SNE for frequency-based features, duration-based features and combined features. In FIGS. 9(a), (b) and (c) most of the data points are of low risk level whereas the medium and high average-risk samples are less observed. t-SNE maps every multi-dimensional input in a data set onto two or three dimensions. When t-sNE-based modeling is complete, similar data are mapped close to each other whereas dissimilar data are mapped onto distant points.

Figure 10A:
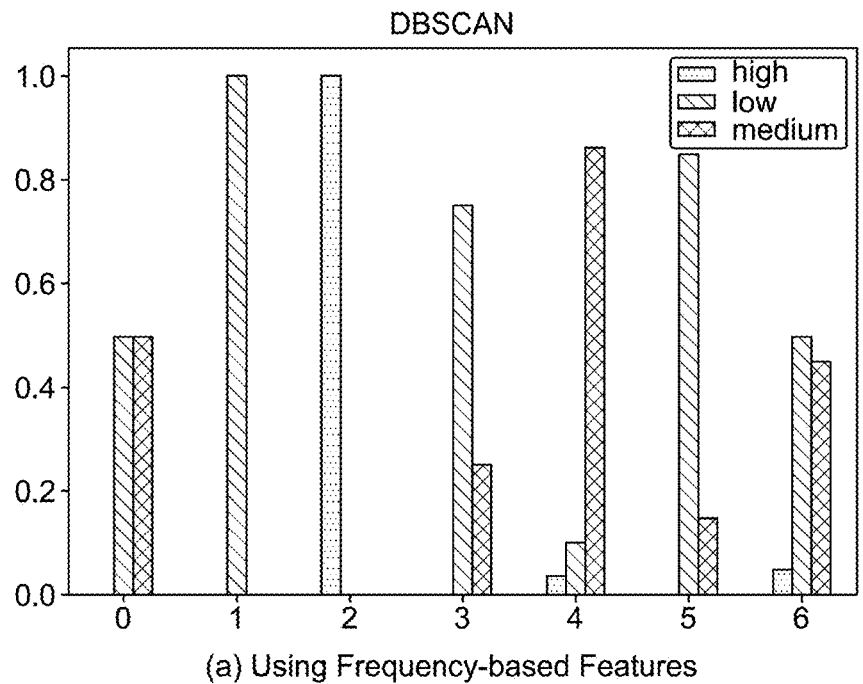
FIGS. 10(*a*)-(*c*) illustrate a DBSCAN Result of Feature-by-Feature Risk Level using Different Features for frequency-based features, duration-based features and combined features in accordance with a numerical evaluation of embodiments of the present disclosure.
Figure 10B:
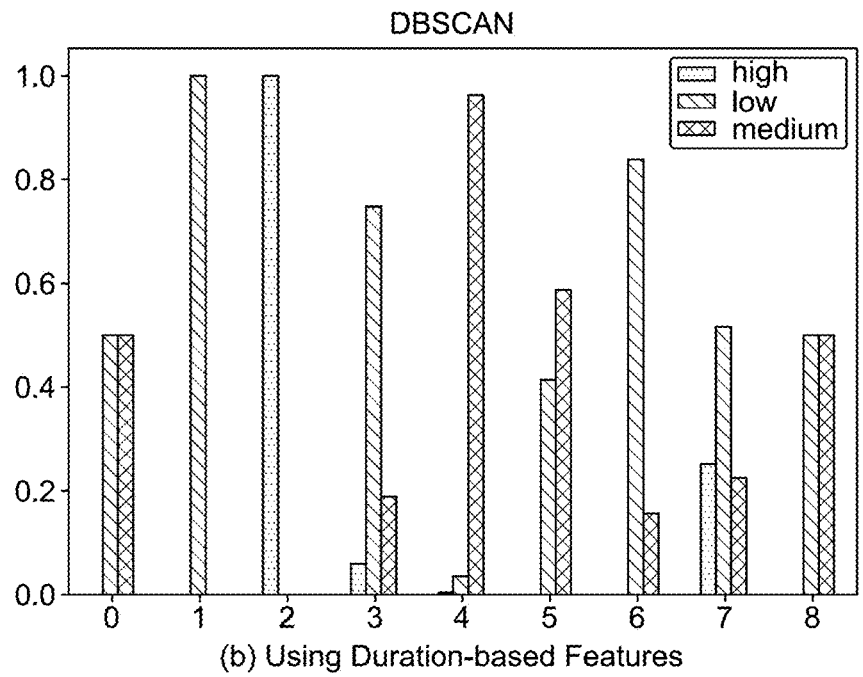
Figure 10C:
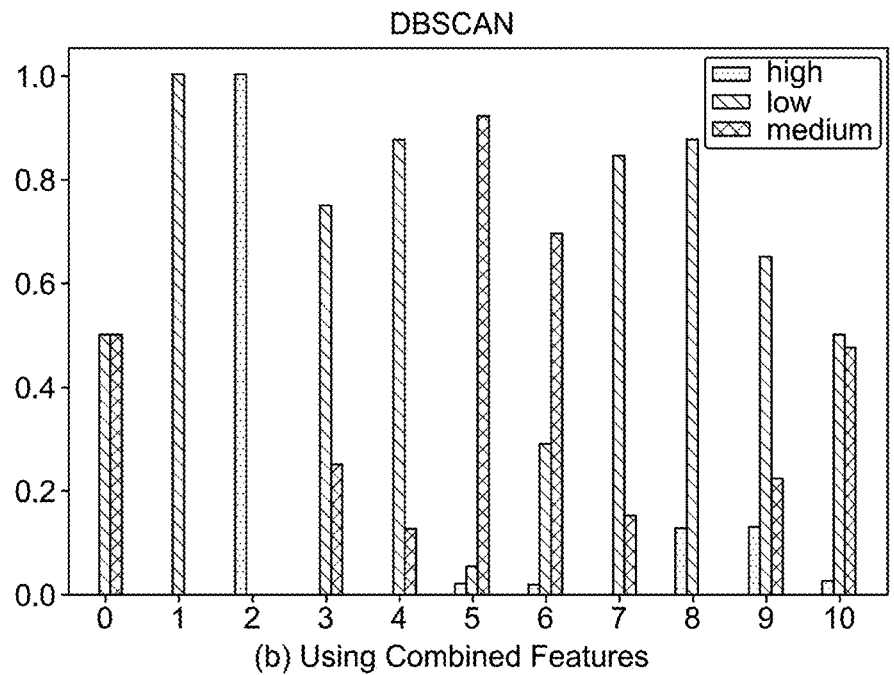
Figure 11A:
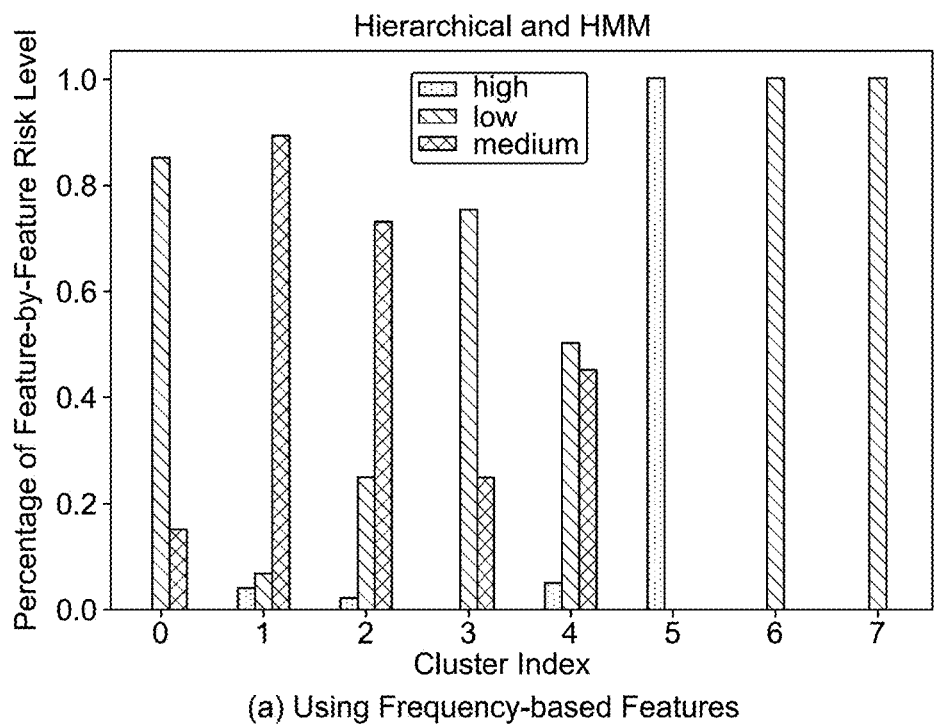
FIGS. 11(*a*)-(*c*) illustrate a Hierarchical and GMM clustering results of feature-by-feature risk level using different features for frequency-based features, duration-based features and combined features in accordance with a numerical evaluation of embodiments of the present disclosure.
Figure 11B:
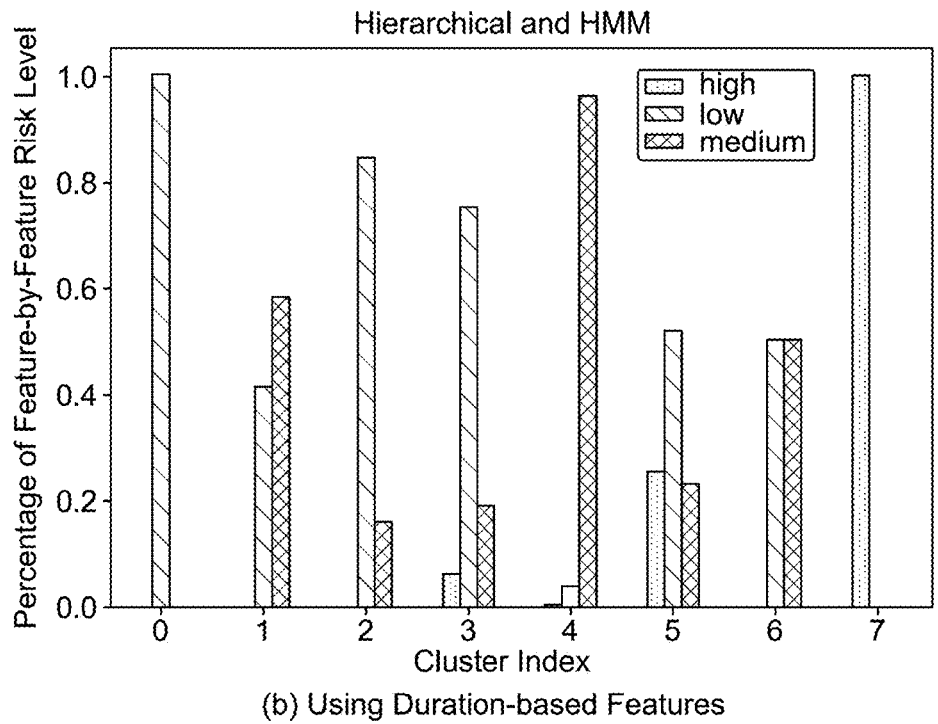
Figure 11C:
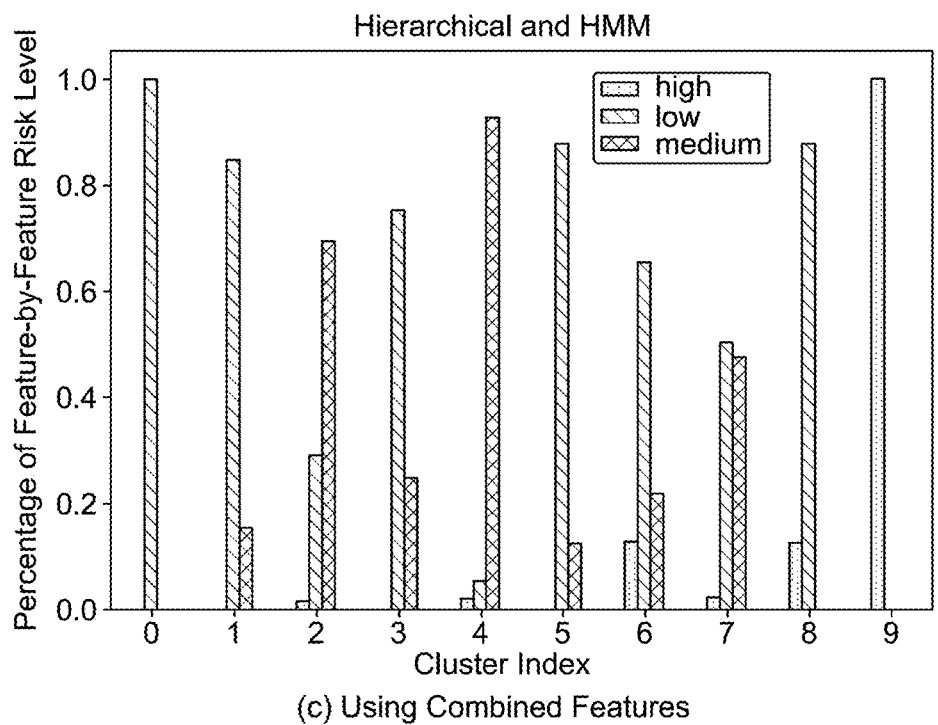
Figure 12A:
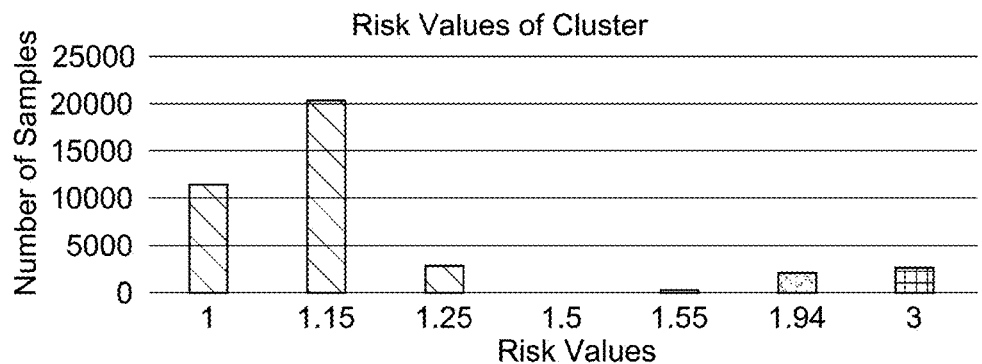
FIGS. 12(*a*)-(*c*) illustrate a DBSCAN Cluster Risk Values using Different Features for frequency-based features, duration-based features and combined features in accordance with a numerical evaluation of embodiments of the present disclosure.
Figure 12B:
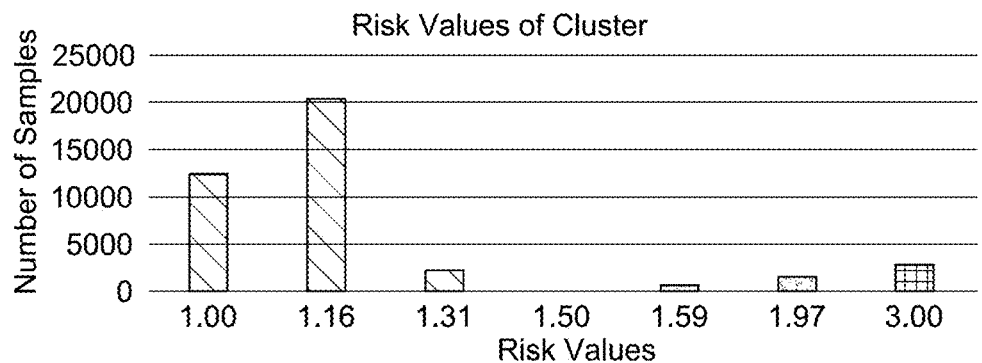
Figure 12C:
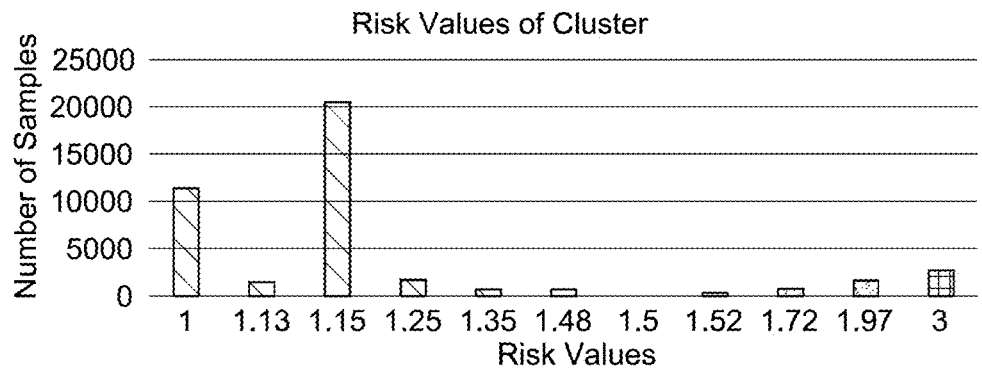

FIGS. 10(a)-(c) illustrate a DB SCAN Result of Feature-by-Feature Risk Level using Different Features for frequency-based features, duration-based features and combined features. FIGS. 11(a)-(c) illustrate a Hierarchical and GMM clustering results of feature-by-feature risk level using different features for frequency-based features, duration-based features and combined features. When FIGS. 10(a)-(c). and FIGS. 11(a)-(c) are compared, given the same number of clusters, DBSCAN, Hierarchical and HMM provide almost the same results. However, DBSCAN provides extra noise points. Both FIGS. 10(a)-(c). and FIGS. 11(a)-(c) illustrate the diversity of three features. However, the results of these three features have similar pattern. Low-risk part is dominant and other types of risk are minor. This pattern also causes the similarity of three figures in FIGS. 12(a)-(c), which illustrate a DBSCAN Cluster Risk Values using Different Features for frequency-based features, duration-based features and combined features. It should be noted that occurrence of this pattern may be only due to the action logs used in the study evaluation. When different action logs are employed, the result of three features may lead to a more significant variation.

Advantageously, DBSCAN does not require the specification of the number of clusters upfront whereas in hierarchical and GMM number of desired clusters are given. If there were more factors in the action logs, the number of features would increase, hence labeling of action clusters by using DB SCAN is generalizable. Although outliers are expected, outliers are not be treated as high-risk samples directly because the events maybe the sub-events of another cluster. For instance, in Table I, II and III, the sample in the cluster −1 does not have documents in this event. Hence, there is no possibility of leaking patients document in such an event. Nevertheless, the outliers should be escalated to the security and policy experts.

As clusters and their feature-by-feature risk levels are obtained, risk values of clusters are calculated according to Equation 10 and binned into 7 groups: Low, Low-medium, medium-low, medium, medium-high, high-medium, and high. Since the actions in medium and low-risk level clusters will be permitted, high average-risk samples are prevented from occurring in medium and low-risk level clusters. Although the average-risk level is not a ground truth, if it shows high-risk, then most of the features of the sample raise alert or medium-risk. As explained above in connection with feature extraction, the coupling value of medium-risk is similar to that of high-risk. There is no brightline boundary between these two risk levels and clustering algorithms provide some potential risk patterns in the action logs.

Figure 13:
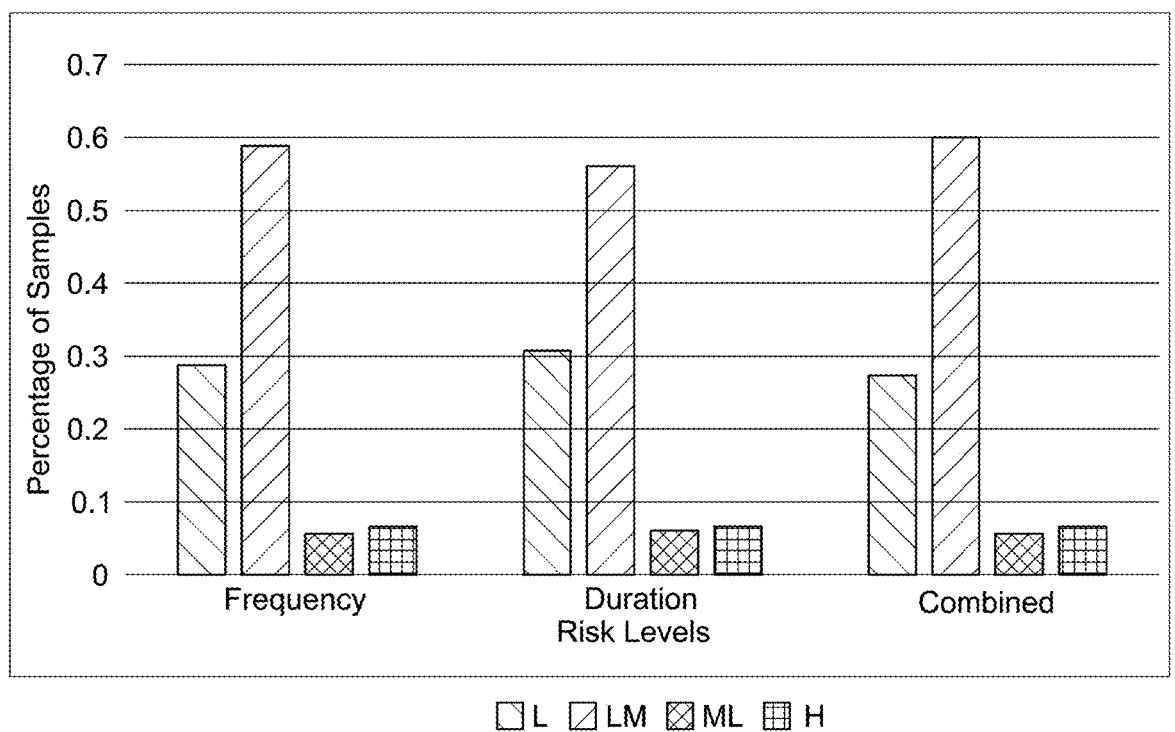
FIG. 13 illustrates a comparison of different Results frequency-based features, duration-based features and combined features in accordance with a numerical evaluation of embodiments of the present disclosure.

The risk values and levels of each cluster are shown on in the Table I, II and III, below. The cluster risk values are sorted and plotted as illustrated in FIG. 13. It will be seen that most clusters are safe clusters whereas only one cluster raises a high-risk alert. Based on this, the risk value of the entire dataset (i.e., action log) can be also be calculated, which is 1.28 in this case.

TABLE I

DBSCAN Result using Duration-based Features

| Index | Risk Value | Risk Level | Number of samples |
|-------|------------|------------|-------------------|
| −1    | 1.5        | LM         | 1                 |
| 0     | 1          | L          | 12612             |
| 1     | 3          | H          | 2804              |
| 2     | 1.31       | LM         | 2234              |
| 3     | 1.97       | ML         | 1492              |
| 4     | 1.59       | ML         | 608               |
| 5     | 1.16       | LM         | 20489             |
| 6     | 1.74       | ML         | 480               |
| 7     | 1.5        | LM         | 246               |

TABLE II

DBSCAN Result using Frequency-based Features

| Index | Risk Value | Risk Level | Number of samples |
|-------|------------|------------|-------------------|
| −1    | 1.5        | LM         | 1                 |
| 0     | 1          | L          | 11754             |
| 1     | 3          | H          | 2804              |
| 2     | 1.25       | LM         | 3082              |
| 3     | 1.94       | ML         | 2100              |
| 4     | 1.15       | LM         | 20979             |
| 5     | 1.55       | ML         | 246               |

TABLE III

DBSCAN Result using Combined-based Features

| Index | Risk Value | Risk Level | Number of samples |
|-------|------------|------------|-------------------|
| −1    | 1.5        | LM         | 1                 |
| 0     | 1          | L          | 11222             |
| 1     | 3          | H          | 2804              |
| 2     | 1.25       | LM         | 1702              |
| 3     | 1.13       | LM         | 1390              |
| 4     | 1.97       | ML         | 1492              |
| 5     | 1.72       | ML         | 608               |
| 6     | 1.15       | LM         | 20489             |
| 7     | 1.25       | LM         | 532               |
| 8     | 1.48       | LM         | 490               |
| 9     | 1.52       | ML         | 246               |

Supervised learning methods, such as decision tree and Support Vector Machine (SVM), validate the results of unsupervised learning and to verify whether the teachings of the present disclosure can be generalized. The model was trained with one dataset (i.e., set of action logs), tested on another dataset with 100% training accuracy and 99.86% test accuracy. SVM achieved a 99.95% test accuracy.

A policy-based access control scheme that utilizes the four frequency-based coupling features introduced above in addition to the traffic may be used to indicate the number of people in the current event, and co-existence, which is triple-coupling, people-document-location coupling. Even though the traffic does not entail any coupling, it is possible to use Equations 8 and 9, and the average value to determine the risk level of each coupling value. Other features would further transform into risk as well. The policy maps the features' risk onto three risk categories: Device Risk, Environment Risk, and Action Risk. Furthermore, it applies a weighted sum of these risks together to determine the overall risk as follows:

$$R_{Dev}=0.5*R_{dev,loc}^{Freq}$$

$$R_{Env}=0.5*R_{traffic}+0.5*R_{co\text{-}existance}^{Freq}$$

$$R_{Act}=0.5*R_{doc,loc}^{Freq}+0.5*R_{doc,time}$$

$$R_{Overall}=0.3*R_{Dev}+0.4*R_{Env}+0.5*R_{Act}$$

The unsupervised method and policy-based method were compared with each other to examine performance. As shown in the Table IV, V, and VI, the frequency-based, duration-based, and combined coupling features show 99.32%, 99.27%, and 99.32% overall consistency, respectively. Since the policy uses the triple factor coupling, it is more likely to detect the rare cases meanwhile it is the only triple factor coupling since only one device exists in the action log. When the number of coupling factors increases, the types of couplings will reduce, and such a situation would occur where the frequency or duration is not enough to make statistical decision because the frequency or duration disperse on more coupling combinations.

TABLE IV

Comparison between Policy and DBSCAN result using Frequency-based Features

| Policy | Permit | | Deny |
|---|---|---|---|
| DBSCAN | Medium-Low | Medium-Low | High |
| Number | 586 | 23 | 2800 |
| Consistency | 100% | | 99.19% |
| Overall Consistency | | 99.32% | |

TABLE V

Comparison between Policy and DBSCAN result using Duration-based Features

| Policy | Permit | | Deny |
|---|---|---|---|
| DBSCAN | Medium-Low | Medium-Low | High |
| Number | 586 | 25 | 2798 |
| Consistency | 100% | | 99.19% |
| Overall Consistency | | 99.27% | |

TABLE VI

Comparison between Policy and DBSCAN result using Combined Features

| Policy | Permit | | Deny |
|---|---|---|---|
| DBSCAN | Medium-Low | Medium-Low | High |
| Number | 586 | 23 | 2800 |
| Consistency | 100% | | 99.19% |
| Overall Consistency | | 99.32% | |

Figure 8:
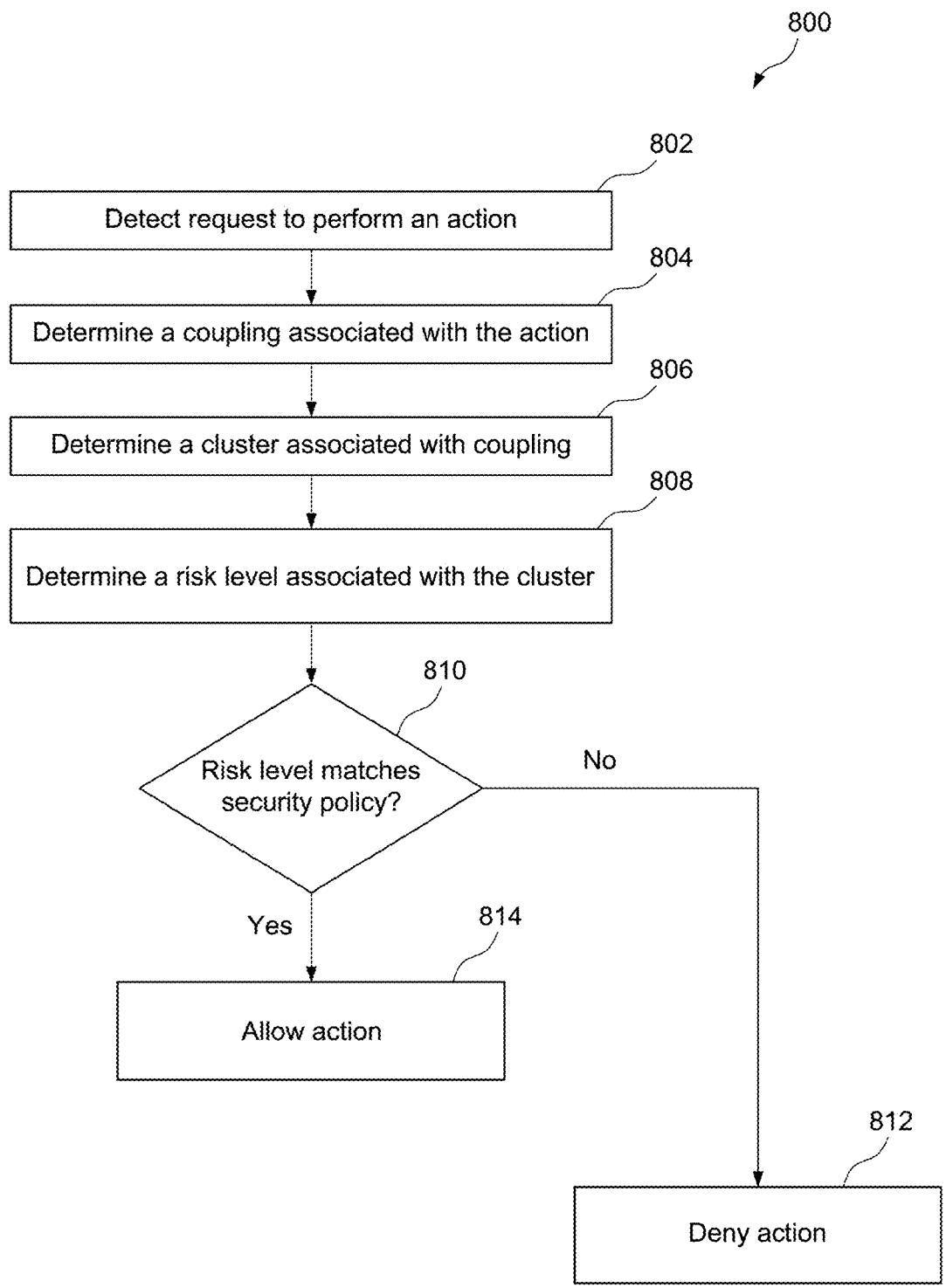
FIG. 8 is a flowchart of a risk-aware access control method in accordance with one example embodiment of the present disclosure.

Referring now to FIG. 8, a risk-aware access control method 800 in accordance with one example embodiment of the present disclosure will be described. The method 800 may be carried out by software executed, for example, by a processor 204 of a computing device 200 illustrated in FIG. 2.

At operation 802, a request to perform an action relating to two factors, the two factors being of a different type, is detected via one or more sensors, such as the sensors 270 or 302. The request may be implicit rather than explicit, such as an attempt to enter or leave a physical location, or an attempt to access a document. As mentioned above, the factors may be physical or cyber elements. Specifically, the factors are each one of people, devices, documents, or location. For example, the requested action may be a request by user Naomi to access document BD2016-01-12.

The sensors may be located remotely from the computing device 200. The sensors may comprise one or more of motion sensors, cameras, microphones, infrared (IR) sensors, proximity sensors, door contacts, data usage and analyzers configured to capture and analyze data requests, and combinations thereof. The data usage and analyzers may be software modules. The sensors may communicate with the computing device 200 via a wireless or wired communication path.

At operation 804, a coupling associated with the requested action is determined based on the factors in the requested action. In the example above, the factors are Naomi (of type "people") and BD2016-01-12 (of type "document"). The determination of the coupling may be implicit rather than explicit, for example, from the extraction of the factors from the action request.

Next, a risk level associated with the coupling is determined. The risk level associated with the coupling may be a risk level of the coupling or a coupling feature derived from the coupling, or a risk level of the cluster in which the coupling is located, as described more fully below.

At operation 806, a cluster of couplings associated with the coupling is determined from a plurality of cluster of couplings using the factors extracted from the coupling (or requested action).

At operation 808, a risk level associated with the cluster of couplings is determined using a predetermined risk level assigned to each cluster in the plurality of clusters.

At operation 810, it is determined whether the determined risk level matches a security policy. The security policy may depend on the requested action. In the present examples, the risk level is one of low, medium, or high, and the requested action is allowed when the requested action is associated with a cluster having a low risk level, the requested action is denied when the requested action is associated with a cluster having a high-risk level, and a determination as to whether to allow the requested action is based on a risk level of the coupling or a coupling feature derived from the coupling.

At operation 812, the requested action is denied in response to a determination that the risk level does not match a security policy. The method 800 may further comprise causing a user authentication challenge in response to denying the requested action. In performing the user authentication challenge, the user authentication challenge typically comprises prompting a user of the computing device 200 for (user) authentication information. The authentication information may comprise a shared secret (e.g., password or personal identification number (PIN)) challenge, biometric challenge, or a combination thereof. The user may be given a number of attempts, a duration of time, or both ("required authentication parameters"), to successfully enter matching authentication information. The authentication information and required authentication parameters are referred to as authentication criteria. A successful user authentication challenge occurs if matching authentication information is entered within required authentication parameters (if any). An unsuccessful user authentication challenge occurs if matching authentication information is not entered within required authentication parameters (if any).

The method may further comprise allowing the requested action in response to a successful user authentication challenge. The method may further comprise causing a security action in response to an unsuccessful user authentication challenge. The security action may comprises one of sending an electronic message to a designated messaging address, adjusting a session security level by a predetermined amount or to a predetermined amount, locking a computing device associated with the requested action, ending a session of a user associated with the requested action, or performing a partial or complete data wipe of a memory of a computing device associated with the requested action, or other security action.

At operation 814, the requested action is allowed in response to a determination that the risk level matches the security policy.

Although not shown in FIG. 8, the requested action is typically denied in response to a determination that the coupling is not located within a cluster as such couplings are considered to be high risk.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

What is claimed is:

1. A method of risk-aware access control performed by a system comprising a hardware processor, the method comprising:
   detecting a request to perform an action, the requested action being associated with respect to a plurality of factors of different types;
   determining a risk level from at least one relationship between two factors, the two factors being of different factor types associated with the requested action, the at least one relationship reflecting an unusualness of a co-occurrence of the two factors of the different factor types for the requested action; and denying, by the system, the requested action based on a determination that the risk level does not satisfy a security policy.

2. The method of claim 1, wherein the risk level is a risk level of the at least one relationship or a relationship feature derived from the at least one relationship.

3. The method of claim 1, comprising:
determining a cluster representing interaction patterns between factors based on several relationships between the two factors; and
determining a risk level of the cluster from risk levels of relationships in the cluster.

4. The method of claim 3, wherein the determining of the risk level from the at least one relationship comprises assigning the risk level of the cluster in which the at least one relationship is grouped as the risk level associated with the at least one relationship.

5. The method of claim 3, wherein:
the risk level from the at least one relationship is one of low, medium, or high,
the requested action is allowed in response to a determination that the requested action is associated with a cluster having a low risk level, and
the requested action is denied in response to a determination that the requested action is associated with a cluster having a high risk level.

6. The method of claim 3, further comprising:
denying the requested action in response to a determination that the at least one relationship is not grouped within a cluster.

7. The method of claim 1, further comprising:
causing a user authentication challenge in response to denying the requested action; and
allowing the requested action in response to a successful user authentication challenge.

8. The method of claim 7, further comprising:
causing a security action in response to an unsuccessful user authentication challenge.

9. The method of claim 8, wherein the security action comprises one or more of:
sending an electronic message to a designated messaging address, adjusting a session security level by a predetermined amount or to a target amount,
locking a computing device associated with the requested action,
ending a session of a user associated with the requested action, or
performing a partial or complete data wipe of a memory of the computing device associated with the requested action.

10. The method of claim 1, wherein the at least one relationship is at least one of duration-based or frequency-based.

11. The method of claim 1, wherein the requested action is detected by one or more sensors, and wherein the one or more sensors comprise one or more of motion sensors, cameras, microphones, infrared (IR) sensors, proximity sensors, door contacts, data usage and analyzers configured to capture and analyze data requests, or combinations thereof.

12. The method of claim 1, wherein each factor type of the different factor types is one of people, device, document, or location.

13. A non-transitory machine-readable medium comprising instructions that upon execution cause a computing device to:

detect a request to perform an action, the requested action being associated with respect to a plurality of factors of different types;
determine a risk level from at least one relationship between two factors, the two factors being of different factor types associated with the requested action, the at least one relationship reflecting an unusualness of a co-occurrence of the two factors of the different factor types for the requested action; and
deny the requested action in response to a determination that the risk level does not satisfy a security policy.

14. The non-transitory machine-readable medium of claim 13, wherein the instructions upon execution cause the computing device to:
determine a cluster representing interaction patterns between factors based on several relationships between the two factors; and
determine a risk level of the cluster from risk levels of relationships in the cluster.

15. The non-transitory machine-readable medium of claim 13, wherein the at least one relationship is based on:
a frequency of interactions between the two factors of the different factor types, or
a time duration that the two factors of the different factor types occur together.

16. The non-transitory machine-readable medium of claim 13, wherein:
the risk level from the at least one relationship is one of low, medium, or high,
the requested action is allowed in response to a determination that the requested action is associated with a cluster having a low risk level, and
the requested action is denied in response to a determination that the requested action is associated with a cluster having a high risk level.

17. The non-transitory machine-readable medium of claim 13, wherein the instructions upon execution cause the computing device to:
deny the requested action in response to a determination that the at least one relationship is not grouped within a cluster.

18. The non-transitory machine-readable medium of claim 13, wherein each factor type of the different factor types is one of people, device, document, or location.

19. A computing device, comprising:
a processor configured to:
detect a request to perform an action, the requested action being associated with respect to a plurality of factors of different types;
determine a risk level from at least one relationship between two factors, the two factors being of different factor types associated with the requested action, the at least one relationship reflecting an unusualness of a co-occurrence of the two factors of the different factor types for the requested action; and
deny the requested action in response to a determination that the risk level does not satisfy a security policy associated with the requested action.

20. The computing device of claim 19, wherein each factor type of the different factor types is one of people, device, document, or location.

* * * * *